(12) United States Patent
    Cianfrocca

(10) Patent No.: US 8,893,253 B2
(45) Date of Patent: Nov. 18, 2014

(54) FIREWALL APPARATUS, SYSTEMS, AND METHODS EMPLOYING DETECTION OF APPLICATION ANOMALIES

(71) Applicant: Bayshore Networks, Inc., Staten Island, NY (US)

(72) Inventor: Francis Cianfrocca, Long Island, NY (US)

(73) Assignee: Bayshore Networks, Inc., Staten Island, NY (US)

( * ) Notice: Subject to any disclaimer, the term of this patent is extended or adjusted under 35 U.S.C. 154(b) by 0 days.

(21) Appl. No.: 13/689,081

(22) Filed: Nov. 29, 2012

(65) Prior Publication Data

US 2013/0139247 A1    May 30, 2013

Related U.S. Application Data

(60) Provisional application No. 61/564,595, filed on Nov. 29, 2011.

(51) Int. Cl.
    *H04L 29/06*    (2006.01)
(52) U.S. Cl.
    CPC ............ *H04L 63/02* (2013.01); *H04L 63/0245* (2013.01)
    USPC .............................................. 726/11; 726/22

(58) Field of Classification Search
    CPC ......... G06F 17/00; H04L 29/06; H04L 63/02; H04L 63/0227; H04L 63/0236; H04L 63/0245; H04L 63/0263
    USPC ......................... 726/14, 11, 22, 13, 1; 706/45
    See application file for complete search history.

(56) References Cited

U.S. PATENT DOCUMENTS

| | | |
|---|---|---|
| 8,135,657 B2 * | 3/2012 | Kapoor et al. .................. 706/45 |
| 2008/0235755 A1 * | 9/2008 | Blaisdell et al. ................. 726/1 |
| 2009/0126020 A1 * | 5/2009 | Norton et al. .................. 726/23 |
| 2010/0036779 A1 * | 2/2010 | Sadeh-Koniecpol et al. ... 706/11 |

\* cited by examiner

*Primary Examiner* — Edward Zee
(74) *Attorney, Agent, or Firm* — Mendelsohn, Drucker & Dunleavy, P.C.; Kevin M. Drucker

(57) ABSTRACT

In one embodiment, a processor-implemented method for monitoring network traffic between a first device executing a software application and a second device coupled to the first device. The method includes: (a) the processor analyzing application-level data contained within traffic originating from and/or received by the first device, the application-level data including data provided to and/or provided by the software application; (b) based on the results of the analysis in step (a), the processor creating one or more access rules; (c) the processor receiving a request from the second device to access the first device, the request including application-level data; and (d) the processor determining whether the request received in step (c) complies with one or more of the access rules.

18 Claims, 24 Drawing Sheets

```xml
<?xml version="1.0"?>
<ns0:policy xmlns:ns0="http://bayshorenetworks.com/pallaton/2012/">
  <ns0:rule verb="allow" control="protocol" op="=" value="http"></ns0:rule>
  <ns0:rule verb="allow" control="ip4.source-address" op="=" value="65.190.2.248"></ns0:rule>
  <ns0:include fragment="http.owasp.basic"></ns0:include>
  <ns0:rule verb="deny" control="http.request.contentscan" op="=" value="1"></ns0:rule>
    <ns0:rule verb="allow" control="http.request.uri" op="=" value="/favicon.ico"></ns0:rule>
    <ns0:rule verb="allow" control="http.request.uri" op="=" value="/"></ns0:rule>
  <ns0:rule verb="allow" control="http.request.uri" op="=" value="/about.php"></ns0:rule>
  <ns0:rule verb="allow" control="http.request.uri" op="=" value="/dvwa/css/login.css"></ns0:rule>
  <ns0:rule verb="allow" control="http.request.uri" op="=" value="/dvwa/css/main.css"></ns0:rule>
  <ns0:rule verb="allow" control="http.request.uri" op="=" value="/dvwa/images/lock.png"></ns0:rule>
  <ns0:rule verb="allow" control="http.request.uri" op="=" value="/dvwa/images/login_logo.png"></ns0:rule>
  <ns0:rule verb="allow" control="http.request.uri" op="=" value="/dvwa/images/logo.png"></ns0:rule>
  <ns0:rule verb="allow" control="http.request.uri" op="=" value="/dvwa/images/spanner.png"></ns0:rule>
  <ns0:rule verb="allow" control="http.request.uri" op="=" value="/dvwa/js/dvwaPage.js"></ns0:rule>
  <ns0:rule verb="allow" control="http.request.uri" op="=" value="/ids_log.php"></ns0:rule>
  <ns0:rule verb="allow" control="http.request.uri" op="=" value="/index.php"></ns0:rule>
  <ns0:rule verb="allow" control="http.request.uri" op="=" value="/instructions.php"></ns0:rule>
  <ns0:rule verb="allow" control="http.request.uri" op="=" value="/login.php"></ns0:rule>
  <ns0:rule verb="allow" control="http.request.uri" op="=" value="/logout.php"></ns0:rule>
  <ns0:rule verb="allow" control="http.request.uri" op="=" value="/phpinfo.php"></ns0:rule>
  <ns0:rule verb="allow" control="http.request.uri" op="=" value="/security.php"></ns0:rule>
  <ns0:rule verb="allow" control="http.request.uri" op="=" value="/setup.php"></ns0:rule>
  <ns0:rule verb="allow" control="http.request.uri" op="=" value="/vulnerabilities/brute/"></ns0:rule>
  <ns0:rule verb="allow" control="http.request.uri" op="=" value="/vulnerabilities/csrf/"></ns0:rule>
  <ns0:rule verb="allow" control="http.request.uri" op="=" value="/vulnerabilities/exec/"></ns0:rule>
  <ns0:rule verb="allow" control="http.request.uri" op="=" value="/vulnerabilities/fi/"></ns0:rule>
  <ns0:rule verb="allow" control="http.request.uri" op="=" value="/vulnerabilities/sqli/"></ns0:rule>
  <ns0:rule verb="allow" control="http.request.uri" op="=" value="/vulnerabilities/sqli_blind/"></ns0:rule>
  <ns0:rule verb="allow" control="http.request.uri" op="=" value="/vulnerabilities/upload/"></ns0:rule>
  <ns0:rule verb="allow" control="http.request.uri" op="=" value="/vulnerabilities/xss_r/"></ns0:rule>
  <ns0:rule verb="allow" control="http.request.uri" op="=" value="/vulnerabilities/xss_s/"></ns0:rule>

<ns0:condition control="http.request.uri" op="=" value="/vulnerabilities/fi/">
    <ns0:rule verb="allow" control="http.request.qs" op="=~" value="page=include.php"></ns0:rule>
    <ns0:rule verb="allow" control="http.request.qs" op="!*" value=""></ns0:rule>
  </ns0:condition>

<ns0:condition control="http.request.uri" op="=" value="/phpinfo.php">
    <ns0:rule verb="allow" control="http.request.qs" op="=~" value="=^([dA-P\d-]{39})$"></ns0:rule>
    <ns0:rule verb="allow" control="http.request.qs" op="=~" value="=^([dA-U\d-]{39})$"></ns0:rule>
    <ns0:rule verb="allow" control="http.request.qs" op="!*" value=""></ns0:rule>
  </ns0:condition>

<ns0:condition control="http.request.uri" op="=" value="/">
    <ns0:rule verb="allow" control="http.request.qs" op="=~" value="doc=PHPIDS-license"></ns0:rule>
    <ns0:rule verb="allow" control="http.request.qs" op="=~" value="doc=changelog"></ns0:rule>
    <ns0:rule verb="allow" control="http.request.qs" op="=~" value="doc=copying"></ns0:rule>
    <ns0:rule verb="allow" control="http.request.qs" op="=~" value="doc=readme"></ns0:rule>
    <ns0:rule verb="allow" control="http.request.qs" op="=~" value="phpids=on"></ns0:rule>
    <ns0:rule verb="allow" control="http.request.qs" op="=~" value="test=^([a-w2%\)\(/\.]{38})$"></ns0:rule>
    <ns0:rule verb="allow" control="http.request.qs" op="!*" value=""></ns0:rule>
  </ns0:condition>
```

FIG. 5a

```
<ns0:condition control="http.request.uri" op="=" value="/instructions.php">
  <ns0:rule verb="allow" control="http.request.qs" op="=~" value="doc=PHPIDS-license"></ns0:rule>
  <ns0:rule verb="allow" control="http.request.qs" op="!*" value=""></ns0:rule>
</ns0:condition>

<ns0:condition control="http.request.uri" op="=" value="/">
  <ns0:condition control="http.request.verb" op="=" value="POST">
    <ns0:rule verb="allow" control="http.request.form" op="=~" value="^([a-tC-R /]{23})$" parameter="create_db"></ns0:rule>
  </ns0:condition>
</ns0:condition>

<ns0:condition control="http.request.uri" op="=" value="http://dvwa.bayshorenetworks.com:9980/">
  <ns0:condition control="http.request.verb" op="=" value="POST">
    <ns0:rule verb="allow" control="http.request.form" op="=~" value="^([a-tC-R /]{23})$" parameter="create_db"></ns0:rule>
  </ns0:condition>
</ns0:condition>

<ns0:condition control="http.request.uri" op="=" value="/">
  <ns0:condition control="http.request.verb" op="=" value="POST">
    <ns0:rule verb="allow" control="http.request.form" op="=~" value="^([A-Za-z0-9]{1,15})$" parameter="ip"></ns0:rule>
    <ns0:rule verb="allow" control="http.request.form" op="=~" value="^([b-u]{6})$" parameter="submit"></ns0:rule>
  </ns0:condition>
</ns0:condition>

<ns0:condition control="http.request.uri" op="=" value="http://dvwa.bayshorenetworks.com:9980/">
  <ns0:condition control="http.request.verb" op="=" value="POST">
    <ns0:rule verb="allow" control="http.request.form" op="=~" value="^([A-Za-z0-9]{1,15})$" parameter="ip"></ns0:rule>
    <ns0:rule verb="allow" control="http.request.form" op="=~" value="^([b-u]{6})$" parameter="submit"></ns0:rule>
  </ns0:condition>
</ns0:condition>

<ns0:condition control="http.request.uri" op="=" value="/vulnerabilities/xss_s/">
  <ns0:condition control="http.request.verb" op="=" value="POST">
    <ns0:rule verb="allow" control="http.request.form" op="=~" value="^([A-Za-z0-9]{1,15})$" parameter="mtxMessage"></ns0:rule>
    <ns0:rule verb="allow" control="http.request.form" op="=~" value="^([b-uG-S ]{14})$" parameter="btnSign"></ns0:rule>
    <ns0:rule verb="allow" control="http.request.form" op="=~" value="^([A-Za-z0-9]{1,15})$" parameter="txtName"></ns0:rule>
  </ns0:condition>
</ns0:condition>
```

FIG. 5b

```
<ns0:condition control="http.request.uri" op="="
value="http://dvwa.bayshorenetworks.com:9980/vulnerabilities/xss_s/">
  <ns0:condition control="http.request.verb" op="=" value="POST">
    <ns0:rule verb="allow" control="http.request.form" op="=~" value="^([A-Za-z0-9]{1,15})$"
parameter="mtxMessage"></ns0:rule>

<ns0:rule verb="allow" control="http.request.form" op="=~" value="^([b-uG-S ]{14})$"
parameter="btnSign"></ns0:rule>

<ns0:rule verb="allow" control="http.request.form" op="=~" value="^([A-Za-z0-9]{1,15})$"
parameter="txtName"></ns0:rule>
  </ns0:condition>
</ns0:condition>

<ns0:condition control="http.request.uri" op="=" value="/">
  <ns0:condition control="http.request.verb" op="=" value="POST">
    <ns0:rule verb="allow" control="http.request.form" op="=~" value="^([A-Za-z0-9]{1,15})$"
parameter="security"></ns0:rule>
    <ns0:rule verb="allow" control="http.request.form" op="=~" value="^([b-uS]{6})$"
parameter="seclev_submit"></ns0:rule>
  </ns0:condition>
</ns0:condition>

<ns0:condition control="http.request.uri" op="=" value="http://dvwa.bayshorenetworks.com:9980/">
  <ns0:condition control="http.request.verb" op="=" value="POST">
    <ns0:rule verb="allow" control="http.request.form" op="=~" value="^([A-Za-z0-9]{1,15})$"
parameter="security"></ns0:rule>
    <ns0:rule verb="allow" control="http.request.form" op="=~" value="^([b-uS]{6})$"
parameter="seclev_submit"></ns0:rule>
  </ns0:condition>
</ns0:condition>

</ns0:policy>
```

FIG. 5c

{"syslog-line":"accepted principal connection, connecting forward peer: setsize=18 connid=50b3943a000140dc peertarget=192.168.0.65:80 clientsource=85.241.169.28:34324 localsource=192.168.0.57:45315 route=lab1.web.8000 protocol=http"}
{"syslog-line":"connected forward peer: peertarget=192.168.0.65:80 localsource=192.168.0.57:45315 connid=50b3943a000140dc"}
{"syslog-line":"accepted principal connection, connecting forward peer: setsize=19 connid=50b3943a000140dd peertarget=192.168.0.65:80 clientsource=85.241.169.28:34326 localsource=192.168.0.57:45316 route=lab1.web.8000 protocol=http"}
{"syslog-line":"accepted principal connection, connecting forward peer: setsize=20 connid=50b3943a000140de peertarget=192.168.0.65:80 clientsource=85.241.169.28:34325 localsource=192.168.0.57:45317 route=lab1.web.8000 protocol=http"}
{"syslog-line":"connected forward peer: peertarget=192.168.0.65:80 localsource=192.168.0.57:45316 connid=50b3943a000140dd"}
{"syslog-line":"connected forward peer: peertarget=192.168.0.65:80 localsource=192.168.0.57:45317 connid=50b3943a000140de"}
{"syslog-line":"> [] protocol| Allow/True/A"}
{"syslog-line":"Rule evaluated 65"}
{"asa-request":{"conn-id":"50b3943a000140cb","disposition":{"status":"accepted"},"http-headers":[{"accept-encoding":""},{"Host":"z.bayshorenetworks.com"},{"User-Agent":"Opera/9.01 (X11; Linux i686; U; en)"},{"X-Forwarded-For":"85.241.169.28"}],"mike-time":"1354015028168268","request-seq":0,"time":"2012-11-27 11:17:08 +0000","uri":"/KpOIKoaZZLIlAtMhY.html","verb":"GET","version":"1.1"}}
{"asa-response":{"conn-id":"50b3943a000140cb","mike-time":"1354015028169106","request-seq":0,"response-headers":[{"Content-Length":"308"},{"Content-Type":"text/html; charset=iso-8859-1"},{"Date":"Tue, 27 Nov 2012 11:23:16 GMT"},{"Server":"no information available"},{"Vary":"Accept-Encoding"},{"x-bayshore-sig":"willoughby-wells-cb"}],"response-line":"HTTP/1.1 404 Not Found","time":"2012-11-27 11:17:08 +0000"}}
{"syslog-line":"> [] protocol| Allow/True/A"}
{"syslog-line":"Rule evaluated 65"}
{"asa-request":{"conn-id":"50b3943a000140cd","disposition":{"status":"accepted"},"http-headers":[{"accept-encoding":""},{"Host":"z.bayshorenetworks.com"},{"User-Agent":"Mozilla/5.0 (compatible)"},{"X-Forwarded-For":"85.241.169.28"}],"mike-time":"1354015028194434","request-seq":0,"time":"2012-11-27 11:17:08 +0000","uri":"/","verb":"GET","version":"1.1"}}
{"syslog-line":"> [] protocol| Allow/True/A"}
{"syslog-line":"Rule evaluated 65"}
{"asa-request":{"conn-id":"50b3943a000140d2","disposition":{"status":"accepted"},"http-headers":[{"accept-encoding":""},{"Host":"z.bayshorenetworks.com"},{"User-Agent":"Mozilla/5.0 (Windows; U; Windows NT 5.1; nl-NL; rv:1.7.5) Gecko/20041202 Firefox/1.0"},{"X-Forwarded-For":"85.241.169.28"}],"mike-time":"1354015028195505","request-seq":0,"time":"2012-11-27 11:17:08 +0000","uri":"/","verb":"HEAD","version":"1.1"}}
{"asa-response":{"conn-id":"50b3943a000140cd","mike-time":"1354015028197571","request-seq":0,"response-headers":[{"Content-Type":"text/html"},{"Date":"Tue, 27 Nov 2012 11:23:16 GMT"},{"Server":"no information available"},{"Transfer-Encoding":"chunked"},{"Vary":"Accept-Encoding"},{"x-bayshore-sig":"willoughby-wells-cb"},{"X-Powered-By":"PHP/5.3.3-7+squeeze14"}],"response-line":"HTTP/1.1 200 OK","time":"2012-11-27 11:17:08 +0000"}}
{"syslog-line":"> [] protocol| Allow/True/A"}
{"syslog-line":"Rule evaluated 65"}
{"asa-request":{"conn-id":"50b3943a000140d0","disposition":{"status":"accepted"},"http-headers":[{"accept-encoding":""},{"Host":"z.bayshorenetworks.com"},{"User-Agent":"Mozilla/4.0 (compatible; MSIE 6.0; MSN 2.5; Windows 98)"},{"X-Forwarded-For":"85.241.169.28"}],"mike-time":"1354015028201537","request-seq":0,"time":"2012-11-27 11:17:08 +0000","uri":"/YYO.aspx","verb":"GET","version":"1.1"}}
{"syslog-line":"> [] protocol| Allow/True/A"}
{"syslog-line":"Rule evaluated 65"}
{"asa-request":{"conn-id":"50b3943a000140ce","disposition":{"status":"accepted"},"http-headers":[{"accept-encoding":""},{"Host":"z.bayshorenetworks.com"},{"User-Agent":"Mozilla/4.0 (compatible; MSIE 6.0; Windows NT 5.1; en) Opera 8.50"},{"X-Forwarded-For":"85.241.169.28"}],"mike-time":"1354015028202301","request-seq":0,"time":"2012-11-27 11:17:08 +0000","uri":"/","verb":"GET","version":"1.1"}}

FIG. 6a

{"asa-response":{"conn-id":"50b3943a000140d0","mike-time":"1354015028203157","request-seq":0,"response-headers":[{"Content-Length":"294"},{"Content-Type":"text/html; charset=iso-8859-1"},{"Date":"Tue, 27 Nov 2012 11:23:16 GMT"},{"Server":"no information available"},{"Vary":"Accept-Encoding"},{"x-bayshore-sig":"willoughby-wells-cb"}],"response-line":"HTTP/1.1 404 Not Found","time":"2012-11-27 11:17:08 +0000"}}
{"asa-response":{"conn-id":"50b3943a000140ce","mike-time":"1354015028205440","request-seq":0,"response-headers":[{"Content-Type":"text/html"},{"Date":"Tue, 27 Nov 2012 11:23:16 GMT"},{"Server":"no information available"},{"Transfer-Encoding":"chunked"},{"Vary":"Accept-Encoding"},{"x-bayshore-sig":"willoughby-wells-cb"},{"X-Powered-By":"PHP/5.3.3-7+squeeze14"}],"response-line":"HTTP/1.1 200 OK","time":"2012-11-27 11:17:08 +0000"}}
{"syslog-line":"> [] protocol| Allow/True/A"}
{"syslog-line":"Rule evaluated 65"}
{"asa-request":{"conn-id":"50b3943a000140cc","disposition":{"status":"accepted"},"http-headers":[{"accept-encoding":""},{"Host":"z.bayshorenetworks.com"},{"User-Agent":"Opera/9.20 (Windows NT 6.0; U; en)"},{"X-Forwarded-For":"85.241.169.28"}],"mike-time":"1354015028236080","request-seq":0,"time":"2012-11-27 11:17:08 +0000","uri":"/UbKrUHIKIIBoPCLb","verb":"HEAD","version":"1.1"}}
{"syslog-line":"> [] protocol| Allow/True/A"}
{"syslog-line":"Rule evaluated 65"}
{"asa-request":{"conn-id":"50b3943a000140d3","disposition":{"status":"accepted"},"http-headers":[{"accept-encoding":""},{"Host":"z.bayshorenetworks.com"},{"User-Agent":"Opera/9.02 (Windows NT 5.1; U; en)"},{"X-Forwarded-For":"85.241.169.28"}],"mike-time":"1354015028240797","request-seq":0,"time":"2012-11-27 11:17:08 +0000","uri":"/ptuclyqVMqKKxJ","verb":"GET","version":"1.1"}}
{"syslog-line":"> [] protocol| Allow/True/A"}
{"syslog-line":"Rule evaluated 65"}
{"asa-request":{"conn-id":"50b3943a000140cf","disposition":{"status":"accepted"},"http-headers":[{"accept-encoding":""},{"Host":"z.bayshorenetworks.com"},{"User-Agent":"Mozilla/5.0 (Windows; U; Windows NT 6.1; ru; rv:1.9.2.3) Gecko/20100401 Firefox/4.0 (.NET CLR 3.5.30729)"},{"X-Forwarded-For":"85.241.169.28"}],"mike-time":"1354015028241461","request-seq":0,"time":"2012-11-27 11:17:08 +0000","uri":"/wfRnzLQDKvpqChNBNdH.html","verb":"HEAD","version":"1.1"}}
{"asa-response":{"conn-id":"50b3943a000140d3","mike-time":"1354015028242149","request-seq":0,"response-headers":[{"Content-Length":"300"},{"Content-Type":"text/html; charset=iso-8859-1"},{"Date":"Tue, 27 Nov 2012 11:23:16 GMT"},{"Server":"no information available"},{"Vary":"Accept-Encoding"},{"x-bayshore-sig":"willoughby-wells-cb"}],"response-line":"HTTP/1.1 404 Not Found","time":"2012-11-27 11:17:08 +0000"}}
{"syslog-line":"> [] protocol| Allow/True/A"}
{"syslog-line":"Rule evaluated 65"}
{"asa-request":{"conn-id":"50b3943a000140d1","disposition":{"status":"accepted"},"http-headers":[{"accept-encoding":""},{"Host":"z.bayshorenetworks.com"},{"User-Agent":"Mozilla/5.0 (X11; U; Linux i686; en-US; rv:1.8.1.2) Gecko/20070221 SUSE/2.0.0.2-6.1 Firefox/2.0.0.2"},{"X-Forwarded-For":"85.241.169.28"}],"mike-time":"1354015028281063","request-seq":0,"time":"2012-11-27 11:17:08 +0000","uri":"/MtHvcMXZHoOJbLBc.html","verb":"GET","version":"1.1"}}
{"asa-response":{"conn-id":"50b3943a000140d1","mike-time":"1354015028281817","request-seq":0,"response-headers":[{"Content-Length":"307"},{"Content-Type":"text/html; charset=iso-8859-1"},{"Date":"Tue, 27 Nov 2012 11:23:16 GMT"},{"Server":"no information available"},{"Vary":"Accept-Encoding"},{"x-bayshore-sig":"willoughby-wells-cb"}],"response-line":"HTTP/1.1 404 Not Found","time":"2012-11-27 11:17:08 +0000"}}
{"syslog-line":"> [] protocol| Allow/True/A"}
{"syslog-line":"Rule evaluated 65"}
{"asa-request":{"conn-id":"50b3943a000140d6","disposition":{"status":"accepted"},"http-headers":[{"accept-encoding":""},{"Host":"z.bayshorenetworks.com"},{"User-Agent":"Mozilla/4.0 (compatible; MSIE 6.0; MSN 2.5; Windows 98)"},{"X-Forwarded-For":"85.241.169.28"}],"mike-time":"1354015028342223","request-seq":0,"time":"2012-11-27 11:17:08 +0000","uri":"/FhZQjcyYDOumKO.php","verb":"GET","version":"1.1"}}
{"asa-response":{"conn-id":"50b3943a000140d6","mike-time":"1354015028342976","request-seq":0,"response-headers":[{"Content-Length":"304"},{"Content-Type":"text/html; charset=iso-8859-1"},{"Date":"Tue, 27 Nov 2012 11:23:16 GMT"},{"Server":"no information available"},{"Vary":"Accept-Encoding"},{"x-bayshore-sig":"willoughby-wells-cb"}],"response-line":"HTTP/1.1 404 Not Found","time":"2012-11-27 11:17:08 +0000"}}

FIG. 6b

{"syslog-line":"accepted principal connection, connecting forward peer: setsize=21 connid=50b3943a000140df peertarget=192.168.0.65:80 clientsource=85.241.169.28:34315 localsource=192.168.0.57:45318 route=lab1.web.8000 protocol=http"}
{"syslog-line":"> [] protocol| Allow/True/A"}
{"syslog-line":"Rule evaluated 65"}
{"asa-request":{"conn-id":"50b3943a000140df","disposition":{"status":"accepted"},"http-headers":[{"accept-encoding":""},{"Host":"z.bayshorenetworks.com"},{"User-Agent":"Mozilla/4.0 (compatible; MSIE 6.0; MSN 2.5; Windows 98)"},{"X-Forwarded-For":"85.241.169.28"}],"mike-time":"1354015028359059","request-seq":0,"time":"2012-11-27 11:17:08 +0000","uri":"/mjgCNIE","verb":"HEAD","version":"1.1"}}
{"syslog-line":"connected forward peer: peertarget=192.168.0.65:80 localsource=192.168.0.57:45318 connid=50b3943a000140df"}
{"syslog-line":"> [] protocol| Allow/True/A"}
{"syslog-line":"Rule evaluated 65"}
{"asa-request":{"conn-id":"50b3943a000140d4","disposition":{"status":"accepted"},"http-headers":[{"accept-encoding":""},{"Host":"z.bayshorenetworks.com"},{"User-Agent":"Mozilla/4.0 (compatible; MSIE 7.0b; Windows NT 6.0)"},{"X-Forwarded-For":"85.241.169.28"}],"mike-time":"1354015028360208","request-seq":0,"time":"2012-11-27 11:17:08 +0000","uri":"/","verb":"HEAD","version":"1.1"}}
{"syslog-line":"> [] protocol| Allow/True/A"}
{"syslog-line":"Rule evaluated 65"}
{"asa-request":{"conn-id":"50b3943a000140d5","disposition":{"status":"accepted"},"http-headers":[{"accept-encoding":""},{"Host":"z.bayshorenetworks.com"},{"User-Agent":"Mozilla/5.0 (Windows; U; Windows NT 5.1; en-US; rv:1.8.1.1) Gecko/20061204 Firefox/2.0.0.1"},{"X-Forwarded-For":"85.241.169.28"}],"mike-time":"1354015028360958","request-seq":0,"time":"2012-11-27 11:17:08 +0000","uri":"/IDE","verb":"GET","version":"1.1"}}
{"syslog-line":"accepted principal connection, connecting forward peer: setsize=22 connid=50b3943a000140e0 peertarget=192.168.0.65:80 clientsource=85.241.169.28:34317 localsource=192.168.0.57:45319 route=lab1.web.8000 protocol=http"}
{"syslog-line":"> [] protocol| Allow/True/A"}
{"syslog-line":"Rule evaluated 65"}
{"asa-request":{"conn-id":"50b3943a000140e0","disposition":{"status":"accepted"},"http-headers":[{"accept-encoding":""},{"Host":"z.bayshorenetworks.com"},{"User-Agent":"Mozilla/5.0 (compatible)"},{"X-Forwarded-For":"85.241.169.28"}],"mike-time":"1354015028362503","request-seq":0,"time":"2012-11-27 11:17:08 +0000","uri":"/DYkZfjdrFgGl.php","verb":"HEAD","version":"1.1"}}
{"syslog-line":"connected forward peer: peertarget=192.168.0.65:80 localsource=192.168.0.57:45319 connid=50b3943a000140e0"}
{"syslog-line":"accepted principal connection, connecting forward peer: setsize=23 connid=50b3943a000140e1 peertarget=192.168.0.65:80 clientsource=85.241.169.28:34318 localsource=192.168.0.57:45320 route=lab1.web.8000 protocol=http"}
{"syslog-line":"> [] protocol| Allow/True/A"}
{"syslog-line":"Rule evaluated 65"}
{"asa-request":{"conn-id":"50b3943a000140e1","disposition":{"status":"accepted"},"http-headers":[{"accept-encoding":""},{"Host":"z.bayshorenetworks.com"},{"User-Agent":"Mozilla/4.0 (compatible; MSIE 6.0; MSN 2.5; Windows 98)"},{"X-Forwarded-For":"85.241.169.28"}],"mike-time":"1354015028374560","request-seq":0,"time":"2012-11-27 11:17:08 +0000","uri":"/","verb":"GET","version":"1.1"}}
{"syslog-line":"connected forward peer: peertarget=192.168.0.65:80 localsource=192.168.0.57:45320 connid=50b3943a000140e1"}
{"syslog-line":"accepted principal connection, connecting forward peer: setsize=24 connid=50b3943a000140e2 peertarget=192.168.0.65:80 clientsource=85.241.169.28:34319 localsource=192.168.0.57:45321 route=lab1.web.8000 protocol=http"}
{"syslog-line":"> [] protocol| Allow/True/A"}
{"syslog-line":"Rule evaluated 65"}
{"asa-request":{"conn-id":"50b3943a000140e2","disposition":{"status":"accepted"},"http-headers":[{"accept-encoding":""},{"Host":"z.bayshorenetworks.com"},{"User-Agent":"Mozilla/4.0 (compatible; MSIE 5.5; Windows NT)"},{"X-Forwarded-For":"85.241.169.28"}],"mike-time":"1354015028407748","request-seq":0,"time":"2012-11-27 11:17:08 +0000","uri":"/ZKTaqpUOSLgdWGco.html","verb":"GET","version":"1.1"}}

FIG. 6c

{"syslog-line":"> [] protocol| Allow/True/A"}
{"syslog-line":"Rule evaluated 65"}
{"asa-request":{"conn-id":"50b3943a000140d7","disposition":{"status":"accepted"},"http-headers":[{"accept-encoding":""},{"Host":"z.bayshorenetworks.com"},{"User-Agent":"Mozilla/5.0 (Windows; U; Windows NT 6.1; ru; rv:1.9.2.3) Gecko/20100401 Firefox/4.0 (.NET CLR 3.5.30729)"},{"X-Forwarded-For":"85.241.169.28"}],"mike-time":"1354015028408357","request-seq":0,"time":"2012-11-27 11:17:08 +0000","uri":"/MNUSOYsorzAdGlQaCHLM.html","verb":"GET","version":"1.1"}}
{"syslog-line":"connected forward peer: peertarget=192.168.0.65:80 localsource=192.168.0.57:45321 connid=50b3943a000140e2"}
{"syslog-line":"> [] protocol| Allow/True/A"}
{"syslog-line":"Rule evaluated 65"}
{"asa-request":{"conn-id":"50b3943a000140d8","disposition":{"status":"accepted"},"http-headers":[{"accept-encoding":""},{"Host":"z.bayshorenetworks.com"},{"User-Agent":"Mozilla/5.0 (X11; U; Linux i686; en-US; rv:1.8.1.2) Gecko/20070220 Firefox/2.0.0.2"},{"X-Forwarded-For":"85.241.169.28"}],"mike-time":"1354015028444116","request-seq":0,"time":"2012-11-27 11:17:08 +0000","uri":"/","verb":"HEAD","version":"1.1"}}
{"syslog-line":"> [] protocol| Allow/True/A"}
{"syslog-line":"Rule evaluated 65"}
{"asa-request":{"conn-id":"50b3943a000140d9","disposition":{"status":"accepted"},"http-headers":[{"accept-encoding":""},{"Host":"z.bayshorenetworks.com"},{"User-Agent":"Opera/8.51 (Windows NT 5.1; U; en)"},{"X-Forwarded-For":"85.241.169.28"}],"mike-time":"1354015028522739","request-seq":0,"time":"2012-11-27 11:17:08 +0000","uri":"/","verb":"GET","version":"1.1"}}
{"syslog-line":"> [] protocol| Allow/True/A"}
{"syslog-line":"Rule evaluated 65"}
{"asa-request":{"conn-id":"50b3943a000140db","disposition":{"status":"accepted"},"http-headers":[{"accept-encoding":""},{"Host":"z.bayshorenetworks.com"},{"User-Agent":"Windows NT 6.0 (MSIE 7.0)"},{"X-Forwarded-For":"85.241.169.28"}],"mike-time":"1354015028523346","request-seq":0,"time":"2012-11-27 11:17:08 +0000","uri":"/","verb":"HEAD","version":"1.1"}}
{"syslog-line":"> [] protocol| Allow/True/A"}
{"syslog-line":"Rule evaluated 65"}
{"asa-request":{"conn-id":"50b3943a000140dc","disposition":{"status":"accepted"},"http-headers":[{"accept-encoding":""},{"Host":"z.bayshorenetworks.com"},{"User-Agent":"Windows-RSS-Platform/1.0 (MSIE 7.0; Windows NT 5.1)"},{"X-Forwarded-For":"85.241.169.28"}],"mike-time":"1354015028667093","request-seq":0,"time":"2012-11-27 11:17:08 +0000","uri":"/","verb":"GET","version":"1.1"}}
{"syslog-line":"> [] protocol| Allow/True/A"}
{"syslog-line":"Rule evaluated 65"}
{"asa-request":{"conn-id":"50b3943a000140da","disposition":{"status":"accepted"},"http-headers":[{"accept-encoding":""},{"Host":"z.bayshorenetworks.com"},{"User-Agent":"Mozilla/4.0 (compatible; MSIE 7.0; Windows NT 5.1; .NET CLR 1.1.4322; .NET CLR 2.0.50727; .NET CLR 3.0.04506.30)"},{"X-Forwarded-For":"85.241.169.28"}],"mike-time":"1354015028667946","request-seq":0,"time":"2012-11-27 11:17:08 +0000","uri":"/IqcQnyhQreGlw.html","verb":"GET","version":"1.1"}}
{"syslog-line":"> [] protocol| Allow/True/A"}
{"syslog-line":"Rule evaluated 65"}
{"asa-request":{"conn-id":"50b3943a000140de","disposition":{"status":"accepted"},"http-headers":[{"accept-encoding":""},{"Host":"z.bayshorenetworks.com"},{"User-Agent":"Opera/9.20 (Windows NT 6.0; U; en)"},{"X-Forwarded-For":"85.241.169.28"}],"mike-time":"1354015028722803","request-seq":0,"time":"2012-11-27 11:17:08 +0000","uri":"/thhfyipmpo","verb":"HEAD","version":"1.1"}}
{"syslog-line":"> [] protocol| Allow/True/A"}
{"syslog-line":"Rule evaluated 65"}
{"asa-request":{"conn-id":"50b3943a000140dd","disposition":{"status":"accepted"},"http-headers":[{"accept-encoding":""},{"Host":"z.bayshorenetworks.com"},{"User-Agent":"Mozilla/4.0 (compatible; MSIE 6.0; Windows NT 5.1; SV1; .NET CLR 1.1.4322)"},{"X-Forwarded-For":"85.241.169.28"}],"mike-time":"1354015028723564","request-seq":0,"time":"2012-11-27 11:17:08 +0000","uri":"/sxJiYjfx.php","verb":"GET","version":"1.1"}}

FIG. 6d

```
{"asa-response":{"conn-id":"50b3943a000140d5","mike-time":"1354015029585921","request-seq":0,"response-
headers":[{"Content-Length":"289"},{"Content-Type":"text/html; charset=iso-8859-1"},{"Date":"Tue, 27 Nov 2012
11:23:17 GMT"},{"Server":"no information available"},{"Vary":"Accept-Encoding"},{"x-bayshore-sig":"willoughby-
wells-cb"}],"response-line":"HTTP/1.1 404 Not Found","time":"2012-11-27 11:17:09 +0000"}}
{"syslog-line":"monitor=active"}
{"syslog-line":"accepted principal connection, connecting forward peer: setsize=25 connid=50b3943a000140e3
peertarget=192.168.0.65:80 clientsource=65.183.151.13:53313 localsource=192.168.0.57:45322
route=lab1.web.8000 protocol=http"}
{"syslog-line":"connected forward peer: peertarget=192.168.0.65:80 localsource=192.168.0.57:45322
connid=50b3943a000140e3"}
{"syslog-line":"accepted principal connection, connecting forward peer: setsize=26 connid=50b3943a000140e4
peertarget=192.168.0.65:80 clientsource=65.183.151.13:53314 localsource=192.168.0.57:45323
route=lab1.web.8000 protocol=http"}
{"syslog-line":"connected forward peer: peertarget=192.168.0.65:80 localsource=192.168.0.57:45323
connid=50b3943a000140e4"}
{"syslog-line":"accepted principal connection, connecting forward peer: setsize=27 connid=50b3943a000140e5
peertarget=192.168.0.65:80 clientsource=65.183.151.13:53315 localsource=192.168.0.57:45324
route=lab1.web.8000 protocol=http"}
{"syslog-line":"connected forward peer: peertarget=192.168.0.65:80 localsource=192.168.0.57:45324
connid=50b3943a000140e5"}
{"syslog-line":"accepted principal connection, connecting forward peer: setsize=28 connid=50b3943a000140e6
peertarget=192.168.0.65:80 clientsource=85.241.169.28:34373 localsource=192.168.0.57:45325
route=lab1.web.8000 protocol=http"}
{"syslog-line":"connected forward peer: peertarget=192.168.0.65:80 localsource=192.168.0.57:45325
connid=50b3943a000140e6"}
{"syslog-line":"accepted principal connection, connecting forward peer: setsize=29 connid=50b3943a000140e7
peertarget=192.168.0.65:80 clientsource=65.183.151.13:53320 localsource=192.168.0.57:45326
route=lab1.web.8000 protocol=http"}
{"syslog-line":"connected forward peer: peertarget=192.168.0.65:80 localsource=192.168.0.57:45326
connid=50b3943a000140e7"}
{"syslog-line":"accepted principal connection, connecting forward peer: setsize=30 connid=50b3943a000140e8
peertarget=192.168.0.65:80 clientsource=65.183.151.13:53322 localsource=192.168.0.57:45327
route=lab1.web.8000 protocol=http"}
{"syslog-line":"accepted principal connection, connecting forward peer: setsize=31 connid=50b3943a000140e9
peertarget=192.168.0.65:80 clientsource=65.183.151.13:53318 localsource=192.168.0.57:45328
route=lab1.web.8000 protocol=http"}
{"syslog-line":"connected forward peer: peertarget=192.168.0.65:80 localsource=192.168.0.57:45327
connid=50b3943a000140e8"}
{"syslog-line":"connected forward peer: peertarget=192.168.0.65:80 localsource=192.168.0.57:45328
connid=50b3943a000140e9"}
{"syslog-line":"accepted principal connection, connecting forward peer: setsize=32 connid=50b3943a000140ea
peertarget=192.168.0.65:80 clientsource=65.183.151.13:53319 localsource=192.168.0.57:45329
route=lab1.web.8000 protocol=http"}
{"syslog-line":"connected forward peer: peertarget=192.168.0.65:80 localsource=192.168.0.57:45329
connid=50b3943a000140ea"}
{"syslog-line":"accepted principal connection, connecting forward peer: setsize=33 connid=50b3943a000140eb
peertarget=192.168.0.65:80 clientsource=65.183.151.13:53321 localsource=192.168.0.57:45330
route=lab1.web.8000 protocol=http"}
{"syslog-line":"connected forward peer: peertarget=192.168.0.65:80 localsource=192.168.0.57:45330
connid=50b3943a000140eb"}
{"syslog-line":"closing connection from principal connid=50b3943a000140cb bytesread=119
byteswritten=531119 duration=3360194"}
{"syslog-line":"closing connection to forward peer connid=50b3943a000140cb bytesread=492 byteswritten=170
duration=3360482"}
```

FIG. 6e

{"syslog-line":"closing connection from principal connid=50b3943a000140d1 bytesread=182 byteswritten=530182 duration=3241715"}
{"syslog-line":"closing connection to forward peer connid=50b3943a000140d1 bytesread=491 byteswritten=233 duration=3241992"}
{"syslog-line":"closing connection from principal connid=50b3943a000140cf bytesread=191 byteswritten=202191 duration=3254660"}
{"syslog-line":"closing connection to forward peer connid=50b3943a000140cf bytesread=163 byteswritten=242 duration=3254947"}
{"asa-response":{"conn-id":"50b3943a000140cf","mike-time":"1354015030229316","request-seq":0,"response-headers":[{"Content-Type":"text/html; charset=iso-8859-1"},{"Date":"Tue, 27 Nov 2012 11:23:16 GMT"},{"Server":"no information available"},{"Vary":"Accept-Encoding"},{"x-bayshore-sig":"willoughby-wells-cb"}],"response-line":"HTTP/1.1 404 Not Found","time":"2012-11-27 11:17:10 +0000"}}
{"syslog-line":"read-error from principal errno=104 connid=50b3943a000140d5"}
{"syslog-line":"closing connection from principal connid=50b3943a000140d5 bytesread=155 byteswritten=512155 duration=3242735"}
{"syslog-line":"closing connection to forward peer connid=50b3943a000140d5 bytesread=473 byteswritten=206 duration=3242935"}
{"asa-response":{"conn-id":"50b3943a000140e2","mike-time":"1354015030231242","request-seq":0,"response-headers":[{"Content-Length":"307"},{"Content-Type":"text/html; charset=iso-8859-1"},{"Date":"Tue, 27 Nov 2012 11:23:18 GMT"},{"Server":"no information available"},{"Vary":"Accept-Encoding"},{"x-bayshore-sig":"willoughby-wells-cb"}],"response-line":"HTTP/1.1 404 Not Found","time":"2012-11-27 11:17:10 +0000"}}
{"asa-response":{"conn-id":"50b3943a000140e1","mike-time":"1354015030231679","request-seq":0,"respnse-headers":[{"Content-Type":"text/html"},{"Date":"Tue, 27 Nov 2012 11:23:18 GMT"},{"Server":"no information available"},{"Transfer-Encoding":"chunked"},{"Vary":"Accept-Encoding"},{"x-bayshore-sig":"willoughby-wells-cb"},{"X-Powered-By":"PHP/5.3.3-7+squeeze14"}],"response-line":"HTTP/1.1 200 OK","time":"2012-11-27 11:17:10 +0000"}}
{"asa-response":{"conn-id":"50b3943a000140d7","mike-time":"1354015030232082","request-seq":0,"response-headers":[{"Content-Length":"311"},{"Content-Type":"text/html; charset=iso-8859-1"},{"Date":"Tue, 27 Nov 2012 11:23:18 GMT"},{"Server":"no information available"},{"Vary":"Accept-Encoding"},{"x-bayshore-sig":"willoughby-wells-cb"}],"response-line":"HTTP/1.1 404 Not Found","time":"2012-11-27 11:17:10 +0000"}}
{"syslog-line":"accepted principal connection, connecting forward peer: setsize=30 connid=50b3943a000140ec peertarget=192.168.0.65:80 clientsource=65.183.151.13:53324 localsource=192.168.0.57:45331 route=lab1.web.8000 protocol=http"}
{"syslog-line":"accepted principal connection, connecting forward peer: setsize=31 connid=50b3943a000140ed peertarget=192.168.0.65:80 clientsource=65.183.151.13:53325 localsource=192.168.0.57:45332 route=lab1.web.8000 protocol=http"}
{"syslog-line":"connected forward peer: peertarget=192.168.0.65:80 localsource=192.168.0.57:45331 connid=50b3943a000140ec"}
{"syslog-line":"connected forward peer: peertarget=192.168.0.65:80 localsource=192.168.0.57:45332 connid=50b3943a000140ed"}
{"syslog-line":"accepted principal connection, connecting forward peer: setsize=32 connid=50b3943a000140ee peertarget=192.168.0.65:80 clientsource=65.183.151.13:53326 localsource=192.168.0.57:45333 route=lab1.web.8000 protocol=http"}
{"syslog-line":"connected forward peer: peertarget=192.168.0.65:80 localsource=192.168.0.57:45333 connid=50b3943a000140ee"}
{"syslog-line":"accepted principal connection, connecting forward peer: setsize=33 connid=50b3943a000140ef peertarget=192.168.0.65:80 clientsource=65.183.151.13:53329 localsource=192.168.0.57:45334 route=lab1.web.8000 protocol=http"}
{"syslog-line":"connected forward peer: peertarget=192.168.0.65:80 localsource=192.168.0.57:45334 connid=50b3943a000140ef"}
{"syslog-line":"accepted principal connection, connecting forward peer: setsize=34 connid=50b3943a000140f0 peertarget=192.168.0.65:80 clientsource=65.183.151.13:53328 localsource=192.168.0.57:45335 route=lab1.web.8000 protocol=http"}

FIG. 6f

{"syslog-line":"accepted principal connection, connecting forward peer: setsize=35 connid=50b3943a000140f1 peertarget=192.168.0.65:80 clientsource=65.183.151.13:53331 localsource=192.168.0.57:45336 route=lab1.web.8000 protocol=http"}
{"syslog-line":"connected forward peer: peertarget=192.168.0.65:80 localsource=192.168.0.57:45335 connid=50b3943a000140f0"}
{"syslog-line":"connected forward peer: peertarget=192.168.0.65:80 localsource=192.168.0.57:45336 connid=50b3943a000140f1"}
{"syslog-line":"accepted principal connection, connecting forward peer: setsize=36 connid=50b3943a000140f2 peertarget=192.168.0.65:80 clientsource=65.183.151.13:53327 localsource=192.168.0.57:45337 route=lab1.web.8000 protocol=http"}
{"syslog-line":"accepted principal connection, connecting forward peer: setsize=37 connid=50b3943a000140f3 peertarget=192.168.0.65:80 clientsource=65.183.151.13:53330 localsource=192.168.0.57:45338 route=lab1.web.8000 protocol=http"}
{"syslog-line":"connected forward peer: peertarget=192.168.0.65:80 localsource=192.168.0.57:45337 connid=50b3943a000140f2"}
{"syslog-line":"connected forward peer: peertarget=192.168.0.65:80 localsource=192.168.0.57:45338 connid=50b3943a000140f3"}
{"syslog-line":"accepted principal connection, connecting forward peer: setsize=38 connid=50b3943a000140f4 peertarget=192.168.0.65:80 clientsource=65.183.151.13:53332 localsource=192.168.0.57:45339 route=lab1.web.8000 protocol=http"}
{"syslog-line":"connected forward peer: peertarget=192.168.0.65:80 localsource=192.168.0.57:45339 connid=50b3943a000140f4"}
{"syslog-line":"accepted principal connection, connecting forward peer: setsize=39 connid=50b3943a000140f5 peertarget=192.168.0.65:80 clientsource=65.183.151.13:53333 localsource=192.168.0.57:45340 route=lab1.web.8000 protocol=http"}
{"syslog-line":"connected forward peer: peertarget=192.168.0.65:80 localsource=192.168.0.57:45340 connid=50b3943a000140f5"}
{"syslog-line":"accepted principal connection, connecting forward peer: setsize=40 connid=50b3943a000140f6 peertarget=192.168.0.65:80 clientsource=85.241.169.28:34374 localsource=192.168.0.57:45341 route=lab1.web.8000 protocol=http"}
{"syslog-line":"connected forward peer: peertarget=192.168.0.65:80 localsource=192.168.0.57:45341 connid=50b3943a000140f6"}
{"syslog-line":"accepted principal connection, connecting forward peer: setsize=41 connid=50b3943a000140f7 peertarget=192.168.0.65:80 clientsource=65.183.151.13:53340 localsource=192.168.0.57:45342 route=lab1.web.8000 protocol=http"}
{"syslog-line":"connected forward peer: peertarget=192.168.0.65:80 localsource=192.168.0.57:45342 connid=50b3943a000140f7"}
{"syslog-line":"accepted principal connection, connecting forward peer: setsize=42 connid=50b3943a000140f8 peertarget=192.168.0.65:80 clientsource=65.183.151.13:53337 localsource=192.168.0.57:45343 route=lab1.web.8000 protocol=http"}
{"syslog-line":"connected forward peer: peertarget=192.168.0.65:80 localsource=192.168.0.57:45343 connid=50b3943a000140f8"}
{"syslog-line":"accepted principal connection, connecting forward peer: setsize=43 connid=50b3943a000140f9 peertarget=192.168.0.65:80 clientsource=65.183.151.13:53338 localsource=192.168.0.57:45344 route=lab1.web.8000 protocol=http"}
{"syslog-line":"connected forward peer: peertarget=192.168.0.65:80 localsource=192.168.0.57:45344 connid=50b3943a000140f9"}
{"syslog-line":"accepted principal connection, connecting forward peer: setsize=44 connid=50b3943a000140fa peertarget=192.168.0.65:80 clientsource=65.183.151.13:53341 localsource=192.168.0.57:45345 route=lab1.web.8000 protocol=http"}
{"syslog-line":"accepted principal connection, connecting forward peer: setsize=45 connid=50b3943a000140fb peertarget=192.168.0.65:80 clientsource=65.183.151.13:53339 localsource=192.168.0.57:45346 route=lab1.web.8000 protocol=http"}
{"syslog-line":"connected forward peer: peertarget=192.168.0.65:80 localsource=192.168.0.57:45345 connid=50b3943a000140fa"}

FIG. 6g

{"syslog-line":"connected forward peer: peertarget=192.168.0.65:80 localsource=192.168.0.57:45346 connid=50b3943a000140fb"}
{"syslog-line":"accepted principal connection, connecting forward peer: setsize=46 connid=50b3943a000140fc peertarget=192.168.0.65:80 clientsource=65.183.151.13:53336 localsource=192.168.0.57:45347 route=lab1.web.8000 protocol=http"}
{"syslog-line":"connected forward peer: peertarget=192.168.0.65:80 localsource=192.168.0.57:45347 connid=50b3943a000140fc"}
{"syslog-line":"closing connection from principal connid=50b3943a000140dc bytesread=113 byteswritten=0113 duration=3094148"}
{"syslog-line":"closing connection to forward peer connid=50b3943a000140dc bytesread=0 byteswritten=164 duration=3094420"}
{"syslog-line":"closing connection from principal connid=50b3943a000140db bytesread=88 byteswritten=088 duration=3148366"}
{"syslog-line":"closing connection to forward peer connid=50b3943a000140db bytesread=0 byteswritten=139 duration=3148590"}
{"syslog-line":"> [] protocol| Allow/True/A"}
{"syslog-line":"Rule evaluated 65"}
{"asa-request":{"conn-id":"50b3943a000140e3","disposition":{"status":"accepted"},"http-headers":[{"accept-encoding":""},{"Host":"z.bayshorenetworks.com"},{"User-Agent":"Opera/6.x (Windows NT 4.0; U) [de]"},{"X-Forwarded-For":"65.183.151.13"}],"mike-time":"1354015030469413","request-seq":0,"time":"2012-11-27 11:17:10 +0000","uri":"/","verb":"GET","version":"1.1"}}
{"syslog-line":"> [] protocol| Allow/True/A"}
{"syslog-line":"Rule evaluated 65"}
{"asa-request":{"conn-id":"50b3943a000140e4","disposition":{"status":"accepted"},"http-headers":[{"accept-encoding":""},{"Host":"z.bayshorenetworks.com"},{"User-Agent":"Mozilla/5.0 (X11; U; Linux i686 (x86_64); en-US; rv:1.9a1) Gecko/20061204 GranParadiso/3.0a1"},{"X-Forwarded-For":"65.183.151.13"}],"mike-time":"1354015030470285","request-seq":0,"time":"2012-11-27 11:17:10 +0000","uri":"/jBFwP.html","verb":"GET","version":"1.1"}}
{"syslog-line":"write-error to principal errno=32 connid=50b3943a000140e1"}
{"syslog-line":"closing connection from principal connid=50b3943a000140e1 bytesread=117 byteswritten=18720117 duration=2111021"}
{"syslog-line":"closing connection to forward peer connid=50b3943a000140e1 bytesread=68650 byteswritten=168 duration=2111234"}
{"syslog-line":"accepted principal connection, connecting forward peer: setsize=44 connid=50b3943a000140fd peertarget=192.168.0.65:80 clientsource=85.241.169.28:34375 localsource=192.168.0.57:45348 route=lab1.web.8000 protocol=http"}
{"syslog-line":"connected forward peer: peertarget=192.168.0.65:80 localsource=192.168.0.57:45348 connid=50b3943a000140fd"}
{"syslog-line":"> [] protocol| Allow/True/A"}
{"syslog-line":"Rule evaluated 65"}
{"asa-request":{"conn-id":"50b3943a000140e7","disposition":{"status":"accepted"},"http-headers":[{"accept-encoding":""},{"Host":"z.bayshorenetworks.com"},{"User-Agent":"Opera/8.51 (Windows NT 5.1; U; en)"},{"X-Forwarded-For":"65.183.151.13"}],"mike-time":"1354015030576596","request-seq":0,"time":"2012-11-27 11:17:10 +0000","uri":"/","verb":"GET","version":"1.1"}}
{"syslog-line":"> [] protocol| Allow/True/A"}
{"syslog-line":"Rule evaluated 65"}
{"asa-request":{"conn-id":"50b3943a000140e5","disposition":{"status":"accepted"},"http-headers":[{"accept-encoding":""},{"Host":"z.bayshorenetworks.com"},{"User-Agent":"Mozilla/5.0 (X11; U; Linux x86_64; en-US; rv:1.9.2.7) Gecko/20100809 Fedora/3.6.7-1.fc14 Firefox/3.6.7"},{"X-Forwarded-For":"65.183.151.13"}],"mike-time":"1354015030577223","request-seq":0,"time":"2012-11-27 11:17:10 +0000","uri":"/","verb":"HEAD","version":"1.1"}}

FIG. 6h

```
{"asa-response":{"conn-id":"50b3943a000140da","mike-time":"1354015030590654","request-seq":0,"response-
headers":[{"Content-Length":"304"},{"Content-Type":"text/html; charset=iso-8859-1"},{"Date":"Tue, 27 Nov 2012
11:23:18 GMT"},{"Server":"no information available"},{"Vary":"Accept-Encoding"},{"x-bayshore-sig":"willoughby-
wells-cb"}],"response-line":"HTTP/1.1 404 Not Found","time":"2012-11-27 11:17:10 +0000"}}

{"asa-response":{"conn-id":"50b3943a000140dd","mike-time":"1354015030592421","request-seq":0,"response-
headers":[{"Content-Length":"298"},{"Content-Type":"text/html; charset=iso-8859-1"},{"Date":"Tue, 27 Nov 2012
11:23:18 GMT"},{"Server":"no information available"},{"Vary":"Accept-Encoding"},{"x-bayshore-sig":"willoughby-
wells-cb"}],"response-line":"HTTP/1.1 404 Not Found","time":"2012-11-27 11:17:10 +0000"}}
{"asa-response":{"conn-id":"50b3943a000140d9","mike-time":"1354015030596212","request-seq":0,"response-
headers":[{"Content-Type":"text/html"},{"Date":"Tue, 27 Nov 2012 11:23:18 GMT"},{"Server":"no information
available"},{"Transfer-Encoding":"chunked"},{"Vary":"Accept-Encoding"},{"x-bayshore-sig":"willoughby-wells-
cb"},{"X-Powered-By":"PHP/5.3.3-7+squeeze14"}],"response-line":"HTTP/1.1 200 OK","time":"2012-11-27
11:17:10 +0000"}}
{"syslog-line":"> [] protocol| Allow/True/A"}
{"syslog-line":"Rule evaluated 65"}
{"asa-request":{"conn-id":"50b3943a000140e8","disposition":{"status":"accepted"},"http-headers":[{"accept-
encoding":""},{"Host":"z.bayshorenetworks.com"},{"User-Agent":"Windows-RSS-Platform/1.0 (MSIE 7.0;
Windows NT 5.1)"},{"X-Forwarded-For":"65.183.151.13"}],"mike-time":"1354015030613231","request-
seq":0,"time":"2012-11-27 11:17:10 +0000","uri":"/","verb":"HEAD","version":"1.1"}}
{"syslog-line":"> [] protocol| Allow/True/A"}
{"syslog-line":"Rule evaluated 65"}
{"asa-request":{"conn-id":"50b3943a000140e9","disposition":{"status":"accepted"},"http-headers":[{"accept-
encoding":""},{"Host":"z.bayshorenetworks.com"},{"User-Agent":"Mozilla/4.0 (compatible; MSIE 7.0; Windows NT
6.0)"},{"X-Forwarded-For":"65.183.151.13"}],"mike-time":"1354015030613997","request-seq":0,"time":"2012-11-
27 11:17:10 +0000","uri":"/","verb":"GET","version":"1.1"}}
{"syslog-line":"> [] protocol| Allow/True/A"}
{"syslog-line":"Rule evaluated 65"}
{"asa-request":{"conn-id":"50b3943a000140ea","disposition":{"status":"accepted"},"http-headers":[{"accept-
encoding":""},{"Host":"z.bayshorenetworks.com"},{"User-Agent":"Mozilla/5.0 (Windows; U; Windows NT 5.1; en-
US; rv:1.8.1.1) Gecko/20061204 Firefox/2.0.0.1"},{"X-Forwarded-For":"65.183.151.13"}],"mike-
time":"1354015030623509","request-seq":0,"time":"2012-11-27 11:17:10
+0000","uri":"/","verb":"GET","version":"1.1"}}
{"syslog-line":"> [] protocol| Allow/True/A"}
{"syslog-line":"Rule evaluated 65"}
{"asa-request":{"conn-id":"50b3943a000140eb","disposition":{"status":"accepted"},"http-headers":[{"accept-
encoding":""},{"Host":"z.bayshorenetworks.com"},{"User-Agent":"Windows-RSS-Platform/1.0 (MSIE 7.0;
Windows NT 5.1)"},{"X-Forwarded-For":"65.183.151.13"}],"mike-time":"1354015030624261","request-
seq":0,"time":"2012-11-27 11:17:10 +0000","uri":"/","verb":"GET","version":"1.1"}}
{"syslog-line":"> [] protocol| Allow/True/A"}
{"syslog-line":"Rule evaluated 65"}
{"asa-request":{"conn-id":"50b3943a000140ed","disposition":{"status":"accepted"},"http-headers":[{"accept-
encoding":""},{"Host":"z.bayshorenetworks.com"},{"User-Agent":"Mozilla/4.0 (compatible; MSIE 6.0; MSN 2.5;
Windows 98)"},{"X-Forwarded-For":"65.183.151.13"}],"mike-time":"1354015030634644","request-
seq":0,"time":"2012-11-27 11:17:10 +0000","uri":"/","verb":"GET","version":"1.1"}}
{"syslog-line":"> [] protocol| Allow/True/A"}
{"syslog-line":"Rule evaluated 65"}
{"asa-request":{"conn-id":"50b3943a000140ec","disposition":{"status":"accepted"},"http-headers":[{"accept-
encoding":""},{"Host":"z.bayshorenetworks.com"},{"User-Agent":"Mozilla/5.0 (Windows; U; Windows NT 6.0; en-
US) AppleWebKit/525.13 (KHTML, like Gecko) Chrome/0.2.149.29 Safari/525.13"},{"X-Forwarded-
For":"65.183.151.13"}],"mike-time":"1354015030635470","request-seq":0,"time":"2012-11-27 11:17:10
+0000","uri":"/","verb":"GET","version":"1.1"}}
{"syslog-line":"> [] protocol| Allow/True/A"}
{"syslog-line":"Rule evaluated 65"}
```

FIG. 6i

{"asa-request":{"conn-id":"50b3943a000140ee","disposition":{"status":"accepted"},"http-headers":[{"accept-encoding":""},{"Host":"z.bayshorenetworks.com"},{"User-Agent":"Mozilla/5.0 (Windows NT 5.1; U; en) Opera 8.50"},{"X-Forwarded-For":"65.183.151.13"}],"mike-time":"1354015030636215","request-seq":0,"time":"2012-11-27 11:17:10 +0000","uri":"/rHUzirVvD","verb":"GET","version":"1.1"}}
{"syslog-line":"accepted principal connection, connecting forward peer: setsize=45 connid=50b3943a000140fe peertarget=192.168.0.65:80 clientsource=50.74.218.194:55556 localsource=192.168.0.57:45349 route=lab1.web.8000 protocol=http"}
{"syslog-line":"connected forward peer: peertarget=192.168.0.65:80 localsource=192.168.0.57:45349 connid=50b3943a000140fe"}
{"syslog-line":"> [] protocol| Allow/True/A"}
{"syslog-line":"Rule evaluated 65"}
{"asa-request":{"conn-id":"50b3943a000140fe","disposition":{"status":"accepted"},"http-headers":[{"Accept":"text/html"},{"accept-encoding":""},{"Connection":"close"},{"Host":"k.bayshorenetworks.com"},{"Keep-Alive":"10"},{"X-Forwarded-For":"50.74.218.194"}],"mike-time":"1354015030681241","request-seq":0,"time":"2012-11-27 11:17:10 +0000","uri":"/","verb":"GET","version":"1.1"}}
{"syslog-line":"> [] protocol| Allow/True/A"}
{"syslog-line":"Rule evaluated 65"}
{"asa-request":{"conn-id":"50b3943a000140ef","disposition":{"status":"accepted"},"http-headers":[{"accept-encoding":""},{"Host":"z.bayshorenetworks.com"},{"User-Agent":"Mozilla/5.0 (Macintosh; U; PPC Mac OS X Mach-O; en-US; rv:1.7.12) Gecko/20050915 Firefox/1.0.7"},{"X-Forwarded-For":"65.183.151.13"}],"mike-time":"1354015030699489","request-seq":0,"time":"2012-11-27 11:17:10 +0000","uri":"/","verb":"HEAD","version":"1.1"}}
{"syslog-line":"> [] protocol| Allow/True/A"}
{"syslog-line":"Rule evaluated 65"}
{"asa-request":{"conn-id":"50b3943a000140f2","disposition":{"status":"accepted"},"http-headers":[{"accept-encoding":""},{"Host":"z.bayshorenetworks.com"},{"User-Agent":"Mozilla/5.0 (X11; U; Linux i686; en-US; rv:1.8.0.2) Gecko/20060308 Firefox/1.5.0.2"},{"X-Forwarded-For":"65.183.151.13"}],"mike-time":"1354015030700254","request-seq":0,"time":"2012-11-27 11:17:10 +0000","uri":"/yqIxPIFbJxyuoIAELGHn","verb":"HEAD","version":"1.1"}}
{"syslog-line":"> [] protocol| Allow/True/A"}
{"syslog-line":"Rule evaluated 65"}
{"asa-request":{"conn-id":"50b3943a000140f0","disposition":{"status":"accepted"},"http-headers":[{"accept-encoding":""},{"Host":"z.bayshorenetworks.com"},{"User-Agent":"Mozilla/4.0 (compatible; MSIE 7.0b; Windows NT 6.0)"},{"X-Forwarded-For":"65.183.151.13"}],"mike-time":"1354015030713441","request-seq":0,"time":"2012-11-27 11:17:10 +0000","uri":"/","verb":"GET","version":"1.1"}}
{"syslog-line":"> [] protocol| Allow/True/A"}
{"syslog-line":"Rule evaluated 65"}
{"asa-request":{"conn-id":"50b3943a000140f1","disposition":{"status":"accepted"},"http-headers":[{"accept-encoding":""},{"Host":"z.bayshorenetworks.com"},{"User-Agent":"Mozilla/5.0 (Windows; U; Windows NT 5.1; en-GB; rv:1.8.0.1) Gecko/20060111 Firefox/1.5.0.1"},{"X-Forwarded-For":"65.183.151.13"}],"mike-time":"1354015030714184","request-seq":0,"time":"2012-11-27 11:17:10 +0000","uri":"/cHyXNUO.htm","verb":"HEAD","version":"1.1"}}
{"syslog-line":"> [] protocol| Allow/True/A"}
{"syslog-line":"Rule evaluated 65"}
{"asa-request":{"conn-id":"50b3943a000140f3","disposition":{"status":"accepted"},"http-headers":[{"accept-encoding":""},{"Host":"z.bayshorenetworks.com"},{"User-Agent":"Opera/9.01 (X11; Linux i686; U; en)"},{"X-Forwarded-For":"65.183.151.13"}],"mike-time":"1354015030714951","request-seq":0,"time":"2012-11-27 11:17:10 +0000","uri":"/","verb":"GET","version":"1.1"}}
{"syslog-line":"> [] protocol| Allow/True/A"}
{"syslog-line":"Rule evaluated 65"}

FIG. 6j

```
{"asa-request":{"conn-id":"50b3943a000140f4","disposition":{"status":"accepted"},"http-headers":[{"accept-
encoding":""},{"Host":"z.bayshorenetworks.com"},{"User-Agent":"Mozilla/5.0 (X11; U; Linux x86_64; en-US;
rv:1.8.1) Gecko/20060601 Firefox/2.0 (Ubuntu-edgy)"},{"X-Forwarded-For":"65.183.151.13"}],"mike-
time":"1354015030718677","request-seq":0,"time":"2012-11-27 11:17:10
+0000","uri":"/NVDGfRW.cfm","verb":"GET","version":"1.1"}}
{"syslog-line":"> [] protocol| Allow/True/A"}
{"syslog-line":"Rule evaluated 65"}
{"asa-request":{"conn-id":"50b3943a000140f5","disposition":{"status":"accepted"},"http-headers":[{"accept-
encoding":""},{"Host":"z.bayshorenetworks.com"},{"User-Agent":"Mozilla/5.0 (Windows; U; Windows NT 5.1; ru;
rv:1.8.1.9) Gecko/20071025 Firefox/2.0.0.9"},{"X-Forwarded-For":"65.183.151.13"}],"mike-
time":"1354015030719350","request-seq":0,"time":"2012-11-27 11:17:10
+0000","uri":"/","verb":"GET","version":"1.1"}}
{"syslog-line":"accepted principal connection, connecting forward peer: setsize=46 connid=50b3943a000140ff
peertarget=192.168.0.65:80 clientsource=85.241.169.28:34381 localsource=192.168.0.57:45350
route=lab1.web.8000 protocol=http"}
{"syslog-line":"connected forward peer: peertarget=192.168.0.65:80 localsource=192.168.0.57:45350
connid=50b3943a000140ff"}
{"syslog-line":"accepted principal connection, connecting forward peer: setsize=47 connid=50b3943a00014100
peertarget=192.168.0.65:80 clientsource=85.241.169.28:34382 localsource=192.168.0.57:45351
route=lab1.web.8000 protocol=http"}
{"syslog-line":"connected forward peer: peertarget=192.168.0.65:80 localsource=192.168.0.57:45351
connid=50b3943a00014100"}
{"syslog-line":"> [] protocol| Allow/True/A"}
{"syslog-line":"Rule evaluated 65"}
{"asa-request":{"conn-id":"50b3943a000140f7","disposition":{"status":"accepted"},"http-headers":[{"accept-
encoding":""},{"Host":"z.bayshorenetworks.com"},{"User-Agent":"Mozilla/5.0 (Windows; U; Windows NT 5.1; en-
US; rv:1.8.1.2) Gecko/20070219 Firefox/2.0.0.2"},{"X-Forwarded-For":"65.183.151.13"}],"mike-
time":"1354015030794695","request-seq":0,"time":"2012-11-27 11:17:10
+0000","uri":"/","verb":"HEAD","version":"1.1"}}
{"syslog-line":"> [] protocol| Allow/True/A"}
{"syslog-line":"Rule evaluated 65"}
{"asa-request":{"conn-id":"50b3943a000140fa","disposition":{"status":"accepted"},"http-headers":[{"accept-
encoding":""},{"Host":"z.bayshorenetworks.com"},{"User-Agent":"Mozilla/5.0 (X11; U; Linux x86_64; en-US;
rv:1.9.2.7) Gecko/20100809 Fedora/3.6.7-1.fc14 Firefox/3.6.7"},{"X-Forwarded-For":"65.183.151.13"}],"mike-
time":"1354015030795474","request-seq":0,"time":"2012-11-27 11:17:10
+0000","uri":"/APdbtOxpNd","verb":"HEAD","version":"1.1"}}
{"syslog-line":"> [] protocol| Allow/True/A"}
{"syslog-line":"Rule evaluated 65"}
{"asa-request":{"conn-id":"50b3943a000140fb","disposition":{"status":"accepted"},"http-headers":[{"accept-
encoding":""},{"Host":"z.bayshorenetworks.com"},{"User-Agent":"Opera/9.10 (Windows NT 5.1; U; en)"},{"X-
Forwarded-For":"65.183.151.13"}],"mike-time":"1354015030835321","request-seq":0,"time":"2012-11-27
11:17:10 +0000","uri":"/hHOHeRjkKYYhkuUF.html","verb":"GET","version":"1.1"}}
{"syslog-line":"> [] protocol| Allow/True/A"}
{"syslog-line":"Rule evaluated 65"}
{"asa-request":{"conn-id":"50b3943a000140f8","disposition":{"status":"accepted"},"http-headers":[{"accept-
encoding":""},{"Host":"z.bayshorenetworks.com"},{"User-Agent":"Mozilla/5.0 (Windows; U; Windows NT 5.1; en-
US; rv:1.8.1.2) Gecko/20070219 Firefox/2.0.0.2"},{"X-Forwarded-For":"65.183.151.13"}],"mike-
time":"1354015030953941","request-seq":0,"time":"2012-11-27 11:17:10
+0000","uri":"/y","verb":"GET","version":"1.1"}}
{"syslog-line":"> [] protocol| Allow/True/A"}
{"syslog-line":"Rule evaluated 65"}
{"asa-request":{"conn-id":"50b3943a000140f9","disposition":{"status":"accepted"},"http-headers":[{"accept-
encoding":""},{"Host":"z.bayshorenetworks.com"},{"User-Agent":"Mozilla/4.0 (compatible; MSIE 6.0; Windows NT
5.1; SV1)"},{"X-Forwarded-For":"65.183.151.13"}],"mike-time":"1354015031063970","request-
seq":0,"time":"2012-11-27 11:17:11 +0000","uri":"/","verb":"GET","version":"1.1"}}
```

FIG. 6k

{"syslog-line":"> [] protocol| Allow/True/A"}
{"syslog-line":"Rule evaluated 65"}
{"asa-request":{"conn-id":"50b3943a000140fc","disposition":{"status":"accepted"},"http-headers":[{"accept-encoding":""},{"Host":"z.bayshorenetworks.com"},{"User-Agent":"Opera/9.20 (Windows NT 6.0; U; en)"},{"X-Forwarded-For":"65.183.151.13"}],"mike-time":"1354015031268142","request-seq":0,"time":"2012-11-27 11:17:11 +0000","uri":"/BNPdwcTkQaqWALes","verb":"GET","version":"1.1"}}
{"asa-response":{"conn-id":"50b3943a000140e4","mike-time":"1354015031593260","request-seq":0,"response-headers":[{"Content-Length":"296"},{"Content-Type":"text/html; charset=iso-8859-1"},{"Date":"Tue, 27 Nov 2012 11:23:19 GMT"},{"Server":"no information available"},{"Vary":"Accept-Encoding"},{"x-bayshore-sig":"willoughby-wells-cb"}],"response-line":"HTTP/1.1 404 Not Found","time":"2012-11-27 11:17:11 +0000"}}
{"asa-response":{"conn-id":"50b3943a000140e3","mike-time":"1354015031606661","request-seq":0,"response-headers":[{"Content-Type":"text/html"},{"Date":"Tue, 27 Nov 2012 11:23:19 GMT"},{"Server":"no information available"},{"Transfer-Encoding":"chunked"},{"Vary":"Accept-Encoding"},{"x-bayshore-sig":"willoughby-wells-cb"},{"X-Powered-By":"PHP/5.3.3-7+squeeze14"}],"response-line":"HTTP/1.1 200 OK","time":"2012-11-27 11:17:11 +0000"}}
{"asa-response":{"conn-id":"50b3943a000140e7","mike-time":"1354015031613322","request-seq":0,"response-headers":[{"Content-Type":"text/html"},{"Date":"Tue, 27 Nov 2012 11:23:19 GMT"},{"Server":"no information available"},{"Transfer-Encoding":"chunked"},{"Vary":"Accept-Encoding"},{"x-bayshore-sig":"willoughby-wells-cb"},{"X-Powered-By":"PHP/5.3.3-7+squeeze14"}],"response-line":"HTTP/1.1 200 OK","time":"2012-11-27 11:17:11 +0000"}}
{"asa-response":{"conn-id":"50b3943a000140e9","mike-time":"1354015031616508","request-seq":0,"response-headers":[{"Content-Type":"text/html"},{"Date":"Tue, 27 Nov 2012 11:23:19 GMT"},{"Server":"no information available"},{"Transfer-Encoding":"chunked"},{"Vary":"Accept-Encoding"},{"x-bayshore-sig":"willoughby-wells-cb"},{"X-Powered-By":"PHP/5.3.3-7+squeeze14"}],"response-line":"HTTP/1.1 200 OK","time":"2012-11-27 11:17:11 +0000"}}
{"asa-response":{"conn-id":"50b3943a000140ea","mike-time":"1354015031619266","request-seq":0,"response-headers":[{"Content-Type":"text/html"},{"Date":"Tue, 27 Nov 2012 11:23:19 GMT"},{"Server":"no information available"},{"Transfer-Encoding":"chunked"},{"Vary":"Accept-Encoding"},{"x-bayshore-sig":"willoughby-wells-cb"},{"X-Powered-By":"PHP/5.3.3-7+squeeze14"}],"response-line":"HTTP/1.1 200 OK","time":"2012-11-27 11:17:11 +0000"}}
{"asa-response":{"conn-id":"50b3943a000140eb","mike-time":"1354015031621817","request-seq":0,"response-headers":[{"Content-Type":"text/html"},{"Date":"Tue, 27 Nov 2012 11:23:19 GMT"},{"Server":"no information available"},{"Transfer-Encoding":"chunked"},{"Vary":"Accept-Encoding"},{"x-bayshore-sig":"willoughby-wells-cb"},{"X-Powered-By":"PHP/5.3.3-7+squeeze14"}],"response-line":"HTTP/1.1 200 OK","time":"2012-11-27 11:17:11 +0000"}}
{"syslog-line":"accepted principal connection, connecting forward peer: setsize=48 connid=50b3943a00014101 peertarget=192.168.0.65:80 clientsource=65.183.151.13:53451 localsource=192.168.0.57:45352 route=lab1.web.8000 protocol=http"}
{"syslog-line":"connected forward peer: peertarget=192.168.0.65:80 localsource=192.168.0.57:45352 connid=50b3943a00014101"}
{"syslog-line":"closing connection from principal connid=50b3943a000140e3 bytesread=96 byteswritten=6862696 duration=2305486"}
{"syslog-line":"closing connection to forward peer connid=50b3943a000140e3 bytesread=68587 byteswritten=147 duration=2305710"}
{"asa-response":{"conn-id":"50b3943a000140ed","mike-time":"1354015032345910","request-seq":0,"response-headers":[{"Content-Type":"text/html"},{"Date":"Tue, 27 Nov 2012 11:23:20 GMT"},{"Server":"no information available"},{"Transfer-Encoding":"chunked"},{"Vary":"Accept-Encoding"},{"x-bayshore-sig":"willoughby-wells-cb"},{"X-Powered-By":"PHP/5.3.3-7+squeeze14"}],"response-line":"HTTP/1.1 200 OK","time":"2012-11-27 11:17:12 +0000"}}
{"syslog-line":"closing connection from principal connid=50b3943a000140e4 bytesread=164 byteswritten=519164 duration=2420089"}
{"syslog-line":"closing connection to forward peer connid=50b3943a000140e4 bytesread=480 byteswritten=215 duration=2420334"}

FIG. 6I

{"asa-response":{"conn-id":"50b3943a000140ec","mike-time":"1354015032482712","request-seq":0,"response-headers":[{"Content-Type":"text/html"},{"Date":"Tue, 27 Nov 2012 11:23:20 GMT"},{"Server":"no information available"},{"Transfer-Encoding":"chunked"},{"Vary":"Accept-Encoding"},{"x-bayshore-sig":"willoughby-wells-cb"},{"X-Powered-By":"PHP/5.3.3-7+squeeze14"}],"response-line":"HTTP/1.1 200 OK","time":"2012-11-27 11:17:12 +0000"}}
{"syslog-line":"> [] protocol| Allow/True/A"}
{"syslog-line":"Rule evaluated 65"}
{"asa-request":{"conn-id":"50b3943a000140f6","disposition":{"status":"accepted"},"http-headers":[{"accept-encoding":""},{"Host":"z.bayshorenetworks.com"},{"User-Agent":"Mozilla/5.0 (Windows; U; Windows NT 5.1; nl-NL; rv:1.7.5) Gecko/20041202 Firefox/1.0"},{"X-Forwarded-For":"85.241.169.28"}],"mike-time":"1354015032580381","request-seq":0,"time":"2012-11-27 11:17:12 +0000","uri":"/","verb":"HEAD","version":"1.1"}}
{"syslog-line":"> [] protocol| Allow/True/A"}
{"syslog-line":"Rule evaluated 65"}
{"asa-request":{"conn-id":"50b3943a00014100","disposition":{"status":"accepted"},"http-headers":[{"accept-encoding":""},{"Host":"z.bayshorenetworks.com"},{"User-Agent":"Mozilla/4.0 (compatible; MSIE 7.0b; Windows NT 6.0)"},{"X-Forwarded-For":"85.241.169.28"}],"mike-time":"1354015032581641","request-seq":0,"time":"2012-11-27 11:17:12 +0000","uri":"/","verb":"GET","version":"1.1"}}
{"syslog-line":"> [] protocol| Allow/True/A"}
{"syslog-line":"Rule evaluated 65"}
{"asa-request":{"conn-id":"50b3943a000140ff","disposition":{"status":"accepted"},"http-headers":[{"accept-encoding":""},{"Host":"z.bayshorenetworks.com"},{"User-Agent":"Mozilla/4.0 (compatible; MSIE 7.0b; Windows NT 6.0)"},{"X-Forwarded-For":"85.241.169.28"}],"mike-time":"1354015032596595","request-seq":0,"time":"2012-11-27 11:17:12 +0000","uri":"/mmPaFtC.html","verb":"HEAD","version":"1.1"}}
{"syslog-line":"> [] protocol| Allow/True/A"}
{"syslog-line":"Rule evaluated 65"}
{"asa-request":{"conn-id":"50b3943a000140e6","disposition":{"status":"accepted"},"http-headers":[{"accept-encoding":""},{"Host":"z.bayshorenetworks.com"},{"User-Agent":"Mozilla/5.0 (Windows; U; Windows NT 5.1; nl-NL; rv:1.7.5) Gecko/20041202 Firefox/1.0"},{"X-Forwarded-For":"85.241.169.28"}],"mike-time":"1354015032597215","request-seq":0,"time":"2012-11-27 11:17:12 +0000","uri":"/KR.aspx","verb":"GET","version":"1.1"}}
{"syslog-line":"> [] protocol| Allow/True/A"}
{"syslog-line":"Rule evaluated 65"}
{"asa-request":{"conn-id":"50b3943a000140fd","disposition":{"status":"accepted"},"http-headers":[{"accept-encoding":""},{"Host":"z.bayshorenetworks.com"},{"User-Agent":"Mozilla/4.0 (compatible; MSIE 5.5; Windows 98)"},{"X-Forwarded-For":"85.241.169.28"}],"mike-time":"1354015032598054","request-seq":0,"time":"2012-11-27 11:17:12 +0000","uri":"/","verb":"HEAD","version":"1.1"}}
{"asa-response":{"conn-id":"50b3943a000140ee","mike-time":"1354015032603668","request-seq":0,"response-headers":[{"Content-Length":"295"},{"Content-Type":"text/html; charset=iso-8859-1"},{"Date":"Tue, 27 Nov 2012 11:23:20 GMT"},{"Server":"no information available"},{"Vary":"Accept-Encoding"},{"x-bayshore-sig":"willoughby-wells-cb"}],"response-line":"HTTP/1.1 404 Not Found","time":"2012-11-27 11:17:12 +0000"}}
{"asa-response":{"conn-id":"50b3943a000140fe","mike-time":"1354015032620106","request-seq":0,"response-headers":[{"Accept-Ranges":"bytes"},{"Connection":"close"},{"Content-Length":"228"},{"Content-Type":"text/html"},{"Date":"Tue, 27 Nov 2012 11:23:20 GMT"},{"ETag":"\"1dc82ea-e4-4cb38f00f8a40\""},{"Last-Modified":"Thu, 04 Oct 2012 10:08:33 GMT"},{"Server":"no information available"},{"Vary":"Accept-Encoding"},{"x-bayshore-sig":"willoughby-wells-cb"}],"response-line":"HTTP/1.1 200 OK","time":"2012-11-27 11:17:12 +0000"}}
{"syslog-line":"closing connection to forward peer connid=50b3943a000140fe bytesread=506 byteswritten=153 duration=1948345"}
{"syslog-line":"closing connection from principal connid=50b3943a000140fe bytesread=96 byteswritten=54596 duration=1948706"}

FIG. 6m

{"asa-response":{"conn-id":"50b3943a000140f4","mike-time":"1354015032633334","request-seq":0,"response-headers":[{"Content-Length":"297"},{"Content-Type":"text/html; charset=iso-8859-1"},{"Date":"Tue, 27 Nov 2012 11:23:20 GMT"},{"Server":"no information available"},{"Vary":"Accept-Encoding"},{"x-bayshore-sig":"willoughby-wells-cb"}],"response-line":"HTTP/1.1 404 Not Found","time":"2012-11-27 11:17:12 +0000"}}
{"asa-response":{"conn-id":"50b3943a000140fb","mike-time":"1354015032642914","request-seq":0,"response-headers":[{"Content-Length":"307"},{"Content-Type":"text/html; charset=iso-8859-1"},{"Date":"Tue, 27 Nov 2012 11:23:20 GMT"},{"Server":"no information available"},{"Vary":"Accept-Encoding"},{"x-bayshore-sig":"willoughby-wells-cb"}],"response-line":"HTTP/1.1 404 Not Found","time":"2012-11-27 11:17:12 +0000"}}
{"asa-response":{"conn-id":"50b3943a000140f8","mike-time":"1354015032646487","request-seq":0,"response-headers":[{"Content-Length":"287"},{"Content-Type":"text/html; charset=iso-8859-1"},{"Date":"Tue, 27 Nov 2012 11:23:20 GMT"},{"Server":"no information available"},{"Vary":"Accept-Encoding"},{"x-bayshore-sig":"willoughby-wells-cb"}],"response-line":"HTTP/1.1 404 Not Found","time":"2012-11-27 11:17:12 +0000"}}
{"asa-response":{"conn-id":"50b3943a000140f0","mike-time":"1354015032646873","request-seq":0,"response-headers":[{"Content-Type":"text/html"},{"Date":"Tue, 27 Nov 2012 11:23:20 GMT"},{"Server":"no information available"},{"Transfer-Encoding":"chunked"},{"Vary":"Accept-Encoding"},{"x-bayshore-sig":"willoughby-wells-cb"},{"X-Powered-By":"PHP/5.3.3-7+squeeze14"}],"response-line":"HTTP/1.1 200 OK","time":"2012-11-27 11:17:12 +0000"}}
{"asa-response":{"conn-id":"50b3943a000140fc","mike-time":"1354015032647630","request-seq":0,"response-headers":[{"Content-Length":"302"},{"Content-Type":"text/html; charset=iso-8859-1"},{"Date":"Tue, 27 Nov 2012 11:23:20 GMT"},{"Server":"no information available"},{"Vary":"Accept-Encoding"},{"x-bayshore-sig":"willoughby-wells-cb"}],"response-line":"HTTP/1.1 404 Not Found","time":"2012-11-27 11:17:12 +0000"}}
{"asa-response":{"conn-id":"50b3943a000140f3","mike-time":"1354015032649528","request-seq":0,"response-headers":[{"Content-Type":"text/html"},{"Date":"Tue, 27 Nov 2012 11:23:20 GMT"},{"Server":"no information available"},{"Transfer-Encoding":"chunked"},{"Vary":"Accept-Encoding"},{"x-bayshore-sig":"willoughby-wells-cb"},{"X-Powered-By":"PHP/5.3.3-7+squeeze14"}],"response-line":"HTTP/1.1 200 OK","time":"2012-11-27 11:17:12 +0000"}}
{"asa-response":{"conn-id":"50b3943a000140f5","mike-time":"1354015032651811","request-seq":0,"response-headers":[{"Content-Type":"text/html"},{"Date":"Tue, 27 Nov 2012 11:23:20 GMT"},{"Server":"no information available"},{"Transfer-Encoding":"chunked"},{"Vary":"Accept-Encoding"},{"x-bayshore-sig":"willoughby-wells-cb"},{"X-Powered-By":"PHP/5.3.3-7+squeeze14"}],"response-line":"HTTP/1.1 200 OK","time":"2012-11-27 11:17:12 +0000"}}
{"asa-response":{"conn-id":"50b3943a000140f9","mike-time":"1354015032655452","request-seq":0,"response-headers":[{"Content-Type":"text/html"},{"Date":"Tue, 27 Nov 2012 11:23:20 GMT"},{"Server":"no information available"},{"Transfer-Encoding":"chunked"},{"Vary":"Accept-Encoding"},{"x-bayshore-sig":"willoughby-wells-cb"},{"X-Powered-By":"PHP/5.3.3-7+squeeze14"}],"response-line":"HTTP/1.1 200 OK","time":"2012-11-27 11:17:12 +0000"}}
{"asa-response":{"conn-id":"50b3943a00014100","mike-time":"1354015032657362","request-seq":0,"response-headers":[{"Content-Type":"text/html"},{"Date":"Tue, 27 Nov 2012 11:23:20 GMT"},{"Server":"no information available"},{"Transfer-Encoding":"chunked"},{"Vary":"Accept-Encoding"},{"x-bayshore-sig":"willoughby-wells-cb"},{"X-Powered-By":"PHP/5.3.3-7+squeeze14"}],"response-line":"HTTP/1.1 200 OK","time":"2012-11-27 11:17:12 +0000"}}
{"syslog-line":"closing connection from principal connid=50b3943a000140e9 bytesread=112 byteswritten=68674112 duration=2526135"}
{"syslog-line":"closing connection to forward peer connid=50b3943a000140e9 bytesread=68635 byteswritten=163 duration=2526484"}
{"syslog-line":"closing connection from principal connid=50b3943a000140e8 bytesread=114 byteswritten=212114 duration=2527217"}
{"syslog-line":"closing connection to forward peer connid=50b3943a000140e8 bytesread=173 byteswritten=165 duration=2527447"}
{"asa-response":{"conn-id":"50b3943a000140e8","mike-time":"1354015032697811","request-seq":0,"response-headers":[{"Content-Type":"text/html"},{"Date":"Tue, 27 Nov 2012 11:23:19 GMT"},{"Server":"no information available"},{"Vary":"Accept-Encoding"},{"x-bayshore-sig":"willoughby-wells-cb"},{"X-Powered-By":"PHP/5.3.3-7+squeeze14"}],"response-line":"HTTP/1.1 200 OK","time":"2012-11-27 11:17:12 +0000"}}

FIG. 6n

{"asa-response":{"conn-id":"50b3943a000140e6","mike-time":"1354015032698545","request-seq":0,"response-headers":[{"Content-Length":"293"},{"Content-Type":"text/html; charset=iso-8859-1"},{"Date":"Tue, 27 Nov 2012 11:23:20 GMT"},{"Server":"no information available"},{"Vary":"Accept-Encoding"},{"x-bayshore-sig":"willoughby-wells-cb"}],"response-line":"HTTP/1.1 404 Not Found","time":"2012-11-27 11:17:12 +0000"}}
{"syslog-line":"closing connection from principal connid=50b3943a000140ef bytesread=157 byteswritten=212157 duration=2503118"}
{"syslog-line":"closing connection to forward peer connid=50b3943a000140ef bytesread=173 byteswritten=208 duration=2503463"}
{"asa-response":{"conn-id":"50b3943a000140ef","mike-time":"1354015032777711","request-seq":0,"response-headers":[{"Content-Type":"text/html"},{"Date":"Tue, 27 Nov 2012 11:23:20 GMT"},{"Server":"no information available"},{"Vary":"Accept-Encoding"},{"x-bayshore-sig":"willoughby-wells-cb"},{"X-Powered-By":"PHP/5.3.3-7+squeeze14"}],"response-line":"HTTP/1.1 200 OK","time":"2012-11-27 11:17:12 +0000"}}
{"syslog-line":"closing connection from principal connid=50b3943a000140ee bytesread=117 byteswritten=518117 duration=2508233"}
{"syslog-line":"closing connection to forward peer connid=50b3943a000140ee bytesread=479 byteswritten=168 duration=2508505"}
{"syslog-line":"closing connection from principal connid=50b3943a000140f2 bytesread=165 byteswritten=202165 duration=2503288"}
{"syslog-line":"closing connection to forward peer connid=50b3943a000140f2 bytesread=163 byteswritten=216 duration=2503634"}
{"asa-response":{"conn-id":"50b3943a000140f2","mike-time":"1354015032779235","request-seq":0,"response-headers":[{"Content-Type":"text/html; charset=iso-8859-1"},{"Date":"Tue, 27 Nov 2012 11:23:20 GMT"},{"Server":"no information available"},{"Vary":"Accept-Encoding"},{"x-bayshore-sig":"willoughby-wells-cb"}],"response-line":"HTTP/1.1 404 Not Found","time":"2012-11-27 11:17:12 +0000"}}
{"syslog-line":"closing connection from principal connid=50b3943a000140f1 bytesread=164 byteswritten=202164 duration=2530603"}
{"syslog-line":"closing connection to forward peer connid=50b3943a000140f1 bytesread=163 byteswritten=215 duration=2530872"}
{"asa-response":{"conn-id":"50b3943a000140f1","mike-time":"1354015032805829","request-seq":0,"response-headers":[{"Content-Type":"text/html; charset=iso-8859-1"},{"Date":"Tue, 27 Nov 2012 11:23:20 GMT"},{"Server":"no information available"},{"Vary":"Accept-Encoding"},{"x-bayshore-sig":"willoughby-wells-cb"}],"response-line":"HTTP/1.1 404 Not Found","time":"2012-11-27 11:17:12 +0000"}}
{"syslog-line":"closing connection from principal connid=50b3943a000140fa bytesread=175 byteswritten=202175 duration=2494698"}
{"syslog-line":"closing connection to forward peer connid=50b3943a000140fa bytesread=163 byteswritten=226 duration=2495045"}
{"asa-response":{"conn-id":"50b3943a000140fa","mike-time":"1354015032896712","request-seq":0,"response-headers":[{"Content-Type":"text/html; charset=iso-8859-1"},{"Date":"Tue, 27 Nov 2012 11:23:20 GMT"},{"Server":"no information available"},{"Vary":"Accept-Encoding"},{"x-bayshore-sig":"willoughby-wells-cb"}],"response-line":"HTTP/1.1 404 Not Found","time":"2012-11-27 11:17:12 +0000"}}
{"syslog-line":"closing connection from principal connid=50b3943a000140f8 bytesread=153 byteswritten=510153 duration=2496530"}
{"syslog-line":"closing connection to forward peer connid=50b3943a000140f8 bytesread=471 byteswritten=204 duration=2496885"}
{"syslog-line":"closing connection from principal connid=50b3943a000140f4 bytesread=165 byteswritten=520165 duration=2606602"}
{"syslog-line":"closing connection to forward peer connid=50b3943a000140f4 bytesread=481 byteswritten=216 duration=2606826"}
{"syslog-line":"accepted principal connection, connecting forward peer: setsize=37 connid=50b3943a00014102 peertarget=192.168.0.65:80 clientsource=50.74.218.194:55570 localsource=192.168.0.57:45353 route=lab1.web.8000 protocol=http"}
{"syslog-line":"connected forward peer: peertarget=192.168.0.65:80 localsource=192.168.0.57:45353 connid=50b3943a00014102"}
{"syslog-line":"> [] protocol| Allow/True/A"}
{"syslog-line":"Rule evaluated 65"}

FIG. 6o

{"asa-request":{"conn-id":"50b3943a00014102","disposition":{"status":"accepted"},"http-headers":[{"Accept":"text/html"},{"accept-encoding":""},{"Connection":"close"},{"Host":"z.bayshorenetworks.com"},{"Keep-Alive":"10"},{"X-Forwarded-For":"50.74.218.194"}],"mike-time":"1354015033051876","request-seq":0,"time":"2012-11-27 11:17:13 +0000","uri":"/./","verb":"HEAD","version":"1.1"}}
{"syslog-line":"closing connection to forward peer connid=50b3943a00014102 bytesread=192 byteswritten=156 duration=45446"}
{"asa-response":{"conn-id":"50b3943a00014102","mike-time":"1354015033053947","request-seq":0,"response-headers":[{"Connection":"close"},{"Content-Type":"text/html"},{"Date":"Tue, 27 Nov 2012 11:23:20 GMT"},{"Server":"no information available"},{"Vary":"Accept-Encoding"},{"x-bayshore-sig":"willoughby-wells-cb"},{"X-Powered-By":"PHP/5.3.3-7+squeeze14"}],"response-line":"HTTP/1.1 200 OK","time":"2012-11-27 11:17:13 +0000"}}
{"syslog-line":"closing connection from principal connid=50b3943a00014102 bytesread=99 byteswritten=23199 duration=46091"}
{"syslog-line":"closing connection from principal connid=50b3943a000140cd bytesread=86 byteswritten=6859686 duration=6221540"}
{"syslog-line":"closing connection to forward peer connid=50b3943a000140cd bytesread=68557 byteswritten=137 duration=6221753"}
{"syslog-line":"accepted principal connection, connecting forward peer: setsize=36 connid=50b3943a00014103 peertarget=192.168.0.65:80 clientsource=65.183.151.13:53525 localsource=192.168.0.57:45354 route=lab1.web.8000 protocol=http"}
{"syslog-line":"write-error to principal errno=32 connid=50b3943a000140ed"}
{"syslog-line":"connected forward peer: peertarget=192.168.0.65:80 localsource=192.168.0.57:45354 connid=50b3943a00014103"}
{"syslog-line":"closing connection from principal connid=50b3943a000140ed bytesread=117 byteswritten=15967117 duration=2959826"}
{"syslog-line":"closing connection to forward peer connid=50b3943a000140ed bytesread=68650 byteswritten=168 duration=2960040"}
{"syslog-line":"accepted principal connection, connecting forward peer: setsize=36 connid=50b3943a00014104 peertarget=192.168.0.65:80 clientsource=65.183.151.13:53527 localsource=192.168.0.57:45355 route=lab1.web.8000 protocol=http"}
{"syslog-line":"connected forward peer: peertarget=192.168.0.65:80 localsource=192.168.0.57:45355 connid=50b3943a00014104"}

FIG. 6p

| TRANSACTION | USER | ADDRESS | IP / LOCATION | TIME | DURATION |
|---|---|---|---|---|---|
| Finance 2000 | | ▬▬▬ | | ‖‖‖‖ | |
| Sales 444 | ▬▬▬ | ▬▬▬ | ▬▬▬ | ▬▬▬ | ‖‖‖‖ |
| Inventory 900 | | ▬▬▬ | | ‖‖‖‖ | |
| Sales 490 | ▓▓▓ | ‖‖‖‖ | ▬▬▬ | | |
| Sales 490 | ▓▓▓ | | | | |
| Finance 2020 | ▓▓▓ | | | | |
| Inventory 901 | | | ‖‖‖‖ | | |
| Finance 2020 | | | | ‖‖‖‖ | ‖‖‖‖ |

FIG. 7

```xml
<?xml version="1.0"?>
<ns0:policy xmlns:ns0="http://bayshorenetworks.com/pallaton/2012/">
<!-- AUTOMATICALLY GENERATED RULES - DO NOT EDIT -->
<!-- the following rule denies access to a whole application based on the source network -->
<ns0:condition control="web.application" op="=" value="financial-system">
 <ns0:rule verb="deny" control="connection.source-ip" op="=" value="10.40.100.0/24">
</ns0:condition>
<!-- the following automatic rule denies access to certain transactions by certain users -->
<ns0:condition control="web.application" op="=" value="financial-system">
 <ns0:condition control="http.request.uri" op="=" value="/post-gl-record">
  <ns0:rule verb="deny" control="user.group" op="in" value="sales-office-new-york">
 </ns0:condition>
</ns0:condition>
<!-- END OF AUTOMATICALLY GENERATED RULES -->
  <ns0:rule verb="allow" control="protocol" op="=" value="http"></ns0:rule>
  <ns0:rule verb="allow" control="ip4.source-address" op="=" value="65.190.2.248"></ns0:rule>
  <ns0:include fragment="http.owasp.basic"></ns0:include>
  <ns0:rule verb="deny" control="http.request.contentscan" op="=" value="1"></ns0:rule>
    <ns0:rule verb="allow" control="http.request.uri" op="=" value="/favicon.ico"></ns0:rule>
    <ns0:rule verb="allow" control="http.request.uri" op="=" value="/"></ns0:rule>
    <ns0:rule verb="allow" control="http.request.uri" op="=" value="/about.php"></ns0:rule>
    <ns0:rule verb="allow" control="http.request.uri" op="=" value="/dvwa/css/login.css"></ns0:rule>
    <ns0:rule verb="allow" control="http.request.uri" op="=" value="/dvwa/css/main.css"></ns0:rule>
    <ns0:rule verb="allow" control="http.request.uri" op="=" value="/dvwa/images/lock.png"></ns0:rule>
    <ns0:rule verb="allow" control="http.request.uri" op="=" value="/dvwa/images/login_logo.png"></ns0:rule>
    <ns0:rule verb="allow" control="http.request.uri" op="=" value="/dvwa/images/logo.png"></ns0:rule>
    <ns0:rule verb="allow" control="http.request.uri" op="=" value="/dvwa/images/spanner.png"></ns0:rule>
    <ns0:rule verb="allow" control="http.request.uri" op="=" value="/dvwa/js/dvwaPage.js"></ns0:rule>
    <ns0:rule verb="allow" control="http.request.uri" op="=" value="/ids_log.php"></ns0:rule>
    <ns0:rule verb="allow" control="http.request.uri" op="=" value="/index.php"></ns0:rule>
    <ns0:rule verb="allow" control="http.request.uri" op="=" value="/instructions.php"></ns0:rule>
    <ns0:rule verb="allow" control="http.request.uri" op="=" value="/login.php"></ns0:rule>
    <ns0:rule verb="allow" control="http.request.uri" op="=" value="/logout.php"></ns0:rule>
    <ns0:rule verb="allow" control="http.request.uri" op="=" value="/phpinfo.php"></ns0:rule>
    <ns0:rule verb="allow" control="http.request.uri" op="=" value="/security.php"></ns0:rule>
    <ns0:rule verb="allow" control="http.request.uri" op="=" value="/setup.php"></ns0:rule>
    <ns0:rule verb="allow" control="http.request.uri" op="=" value="/vulnerabilities/brute/"></ns0:rule>
    <ns0:rule verb="allow" control="http.request.uri" op="=" value="/vulnerabilities/csrf/"></ns0:rule>
    <ns0:rule verb="allow" control="http.request.uri" op="=" value="/vulnerabilities/exec/"></ns0:rule>
    <ns0:rule verb="allow" control="http.request.uri" op="=" value="/vulnerabilities/fi/"></ns0:rule>
    <ns0:rule verb="allow" control="http.request.uri" op="=" value="/vulnerabilities/sqli/"></ns0:rule>
    <ns0:rule verb="allow" control="http.request.uri" op="=" value="/vulnerabilities/sqli_blind/"></ns0:rule>
    <ns0:rule verb="allow" control="http.request.uri" op="=" value="/vulnerabilities/upload/"></ns0:rule>
    <ns0:rule verb="allow" control="http.request.uri" op="=" value="/vulnerabilities/xss_r/"></ns0:rule>
    <ns0:rule verb="allow" control="http.request.uri" op="=" value="/vulnerabilities/xss_s/"></ns0:rule>

<ns0:condition control="http.request.uri" op="=" value="/vulnerabilities/fi/">
    <ns0:rule verb="allow" control="http.request.qs" op="=~" value="page=include.php"></ns0:rule>
    <ns0:rule verb="allow" control="http.request.qs" op="!*" value=""></ns0:rule>
  </ns0:condition>

<ns0:condition control="http.request.uri" op="=" value="/phpinfo.php">
    <ns0:rule verb="allow" control="http.request.qs" op="=~" value="=^([dA-P\d-]{39})$"></ns0:rule>
    <ns0:rule verb="allow" control="http.request.qs" op="=~" value="=^([dA-U\d-]{39})$"></ns0:rule>
    <ns0:rule verb="allow" control="http.request.qs" op="!*" value=""></ns0:rule>
  </ns0:condition>

<ns0:condition control="http.request.uri" op="=" value="/">
    <ns0:rule verb="allow" control="http.request.qs" op="=~" value="doc=PHPIDS-license"></ns0:rule>
    <ns0:rule verb="allow" control="http.request.qs" op="=~" value="doc=changelog"></ns0:rule>
    <ns0:rule verb="allow" control="http.request.qs" op="=~" value="doc=copying"></ns0:rule>
    <ns0:rule verb="allow" control="http.request.qs" op="=~" value="doc=readme"></ns0:rule>
    <ns0:rule verb="allow" control="http.request.qs" op="=~" value="phpids=on"></ns0:rule>
    <ns0:rule verb="allow" control="http.request.qs" op="=~" value="test=^([a-w2%\)\(/\.]{38})$"></ns0:rule>
    <ns0:rule verb="allow" control="http.request.qs" op="!*" value=""></ns0:rule>
  </ns0:condition>
```

FIG. 8

FIREWALL APPARATUS, SYSTEMS, AND METHODS EMPLOYING DETECTION OF APPLICATION ANOMALIES

CROSS-REFERENCE TO RELATED APPLICATION

This application claims priority to co-pending U.S. Provisional Patent Application Ser. No. 61/564,595, filed Nov. 29, 2011, the disclosure of which is incorporated herein by reference in its entirety.

BACKGROUND

1. Technical Field

The disclosure relates, generally, to networks, and more particularly, to the monitoring and blocking of certain network traffic.

2. Description of Related Art

Firewalls and various other hardware and/or software components are used in networks to monitor and selectively block network traffic for various reasons, such as preventing unauthorized access to different networked hardware and/or software components. Conventional firewalls typically make access-control determinations based on characteristics of the network connections that traverse them. For example, conventional firewalls might block accesses originating from, passing through, and/or directed to specific combinations of Internet-Protocol (IP) addresses and ports. Other conventional firewalls control access based on a particular data protocol (i.e., information-encoding standard) being used. For example, a firewall might be configured to recognize the difference between the HTTP and SMTP protocols and block the former but not the latter. Alternatively, such firewalls might recognize that a specific access is directed toward a particular web application, such as a public instant-messaging system, and block access on that basis.

Thus, conventional access control schemes focus on controlling access by inspection of the characteristics of the person or computer accessing the information system the communications channels through which those accesses are made. This approach can ultimately be unsatisfactory, because a determined and clever attacker has multiple pathways for stealing access credentials and impersonating authorized users.

More specifically, many information systems employing conventional firewalls are still at risk of attacks mediated through the actual data and operational commands supported by those information systems, because conventional firewalls are unable to protect against such vulnerabilities. For example, unauthorized use or attempted unauthorized use of an industrial robot is not likely to be detected by a conventional firewall, so long as the unauthorized user accesses the robot via an IP address, a port, and a data protocol that are all valid. With a stolen or "hacked" valid password in hand, the unauthorized user can take advantage of such easy access to log in and use the robot. Even without having the password in hand, the unauthorized user might take advantage of such easy access to execute an automated software program for hacking into the system to obtain a valid password and then log in to use the robot using that password. Either way, using a conventional firewall renders the industrial robot defenseless against such vulnerabilities.

SUMMARY

Embodiments of the disclosure provide solutions to the foregoing problems and additional benefits, by providing firewall systems and methods that collect extensive operational data on the behavior of one or more electronic information systems, detect behaviors that depart meaningfully from the typical behavior of those systems, and then inhibit and/or report the presence of such behaviors to administrative personnel. A scheme consistent with embodiments of the disclosure can be implemented, e.g., in a single firewall or in a plurality of interconnected firewalls that are configured to share with one another rules constructed using information regarding normal or expected behaviors.

In one embodiment, the present disclosure provides a processor-implemented method for monitoring network traffic between a first device executing a software application and a second device coupled to the first device. The method includes: (a) the processor analyzing application-level data contained within traffic originating from and/or received by the first device, the application-level data including data provided to and/or provided by the software application; (b) based on the results of the analysis in step (a), the processor creating one or more access rules; (c) the processor receiving a request from the second device to access the first device, the request including application-level data; and (d) the processor determining whether the request received in step (c) complies with one or more of the access rules.

In another embodiment, the present disclosure provides an apparatus for monitoring network traffic. The apparatus includes a first firewall having a processor, an analytical engine, an analytical-results database, and network-proxying software. The analytical engine is adapted to analyze application-level data contained within traffic originating from and/or received by a first device executing a software application. The application-level data includes data provided to and/or provided by the software application. The analytical-results database includes one or more access rules created based on the analysis of the application-level data by the analytical engine. The network-proxying software is adapted to determine whether a request, from a second device coupled to the first device, to access the first device complies with one or more of the access rules stored in the analytical-results database. The request from the second device includes application-level data.

BRIEF DESCRIPTION OF THE DRAWINGS

FIGS. 5a, 5b 5c collectively show an exemplary rule set stored in an analytical-results database, in one embodiment of the disclosure;

FIGS. 6a, 6b, 6c, 6d, 6e, 6f, 6g, 6h, 6i, 6j, 6k, 6l, 6m, 6n, 6o and 6p collectively show a set of exemplary collected application-specific transactions collected from multiple different applications and stored in an analytical-results database, in one embodiment of the disclosure;

FIG. 7 shows an exemplary matrix containing such a list of classifications stored in an analytical-results database, in one embodiment of the disclosure; and FIG. 8 shows an exemplary set of updated rules produced as a result of the cluster analysis and stored in an analytical-results database, in one embodiment of the disclosure.

DETAILED DESCRIPTION

Information systems for various purposes employ various hardware and software components networked together in various configurations of public and/or private networks. Such information systems include, e.g., World-Wide Web sites used either internally in businesses or on the open Internet; databases of business transactions or other operational information; mobile applications accessed by smartphones and other handheld devices; control and monitoring systems for industrial plants (such as factories and chemical processing plants); civil infrastructure (such as the electrical grid, oil/gas pipelines, and municipal water systems); building and factory-floor automation; environmental controls; and transportation infrastructure (such as airports and railways).

These information systems are accessed either remotely or locally by administrators and users by way of electronic communications networks. Data is transmitted over communications networks by and between the information systems and the human and/or automated entities accessing them. The actual data transmitted in communications with these information systems might contain, e.g., queries, responses to queries, operational commands, commands to initiate or modify business transactions, commands to modify the behavior of industrial equipment, or any of a wide variety of other possibilities.

Embodiments of the disclosure analyze this application-level data handled by an information system, with the recognition that such data can be used as an optimal indicator of stability, correctness, and operational integrity. It can be difficult to predict a priori the full range of normal behavior of information systems of any complexity, because that behavior can be dynamic across time, both in periodic and non-periodic ways. It can also be unsatisfactory to control access by enforcing static rules on the kinds of transactions which may be requested of an information system, and on the ranges of data that they may contain. The dynamic nature of complex systems makes such an approach impractical. Embodiments of the present disclosure are directed toward a more dynamic approach.

Figure 1:
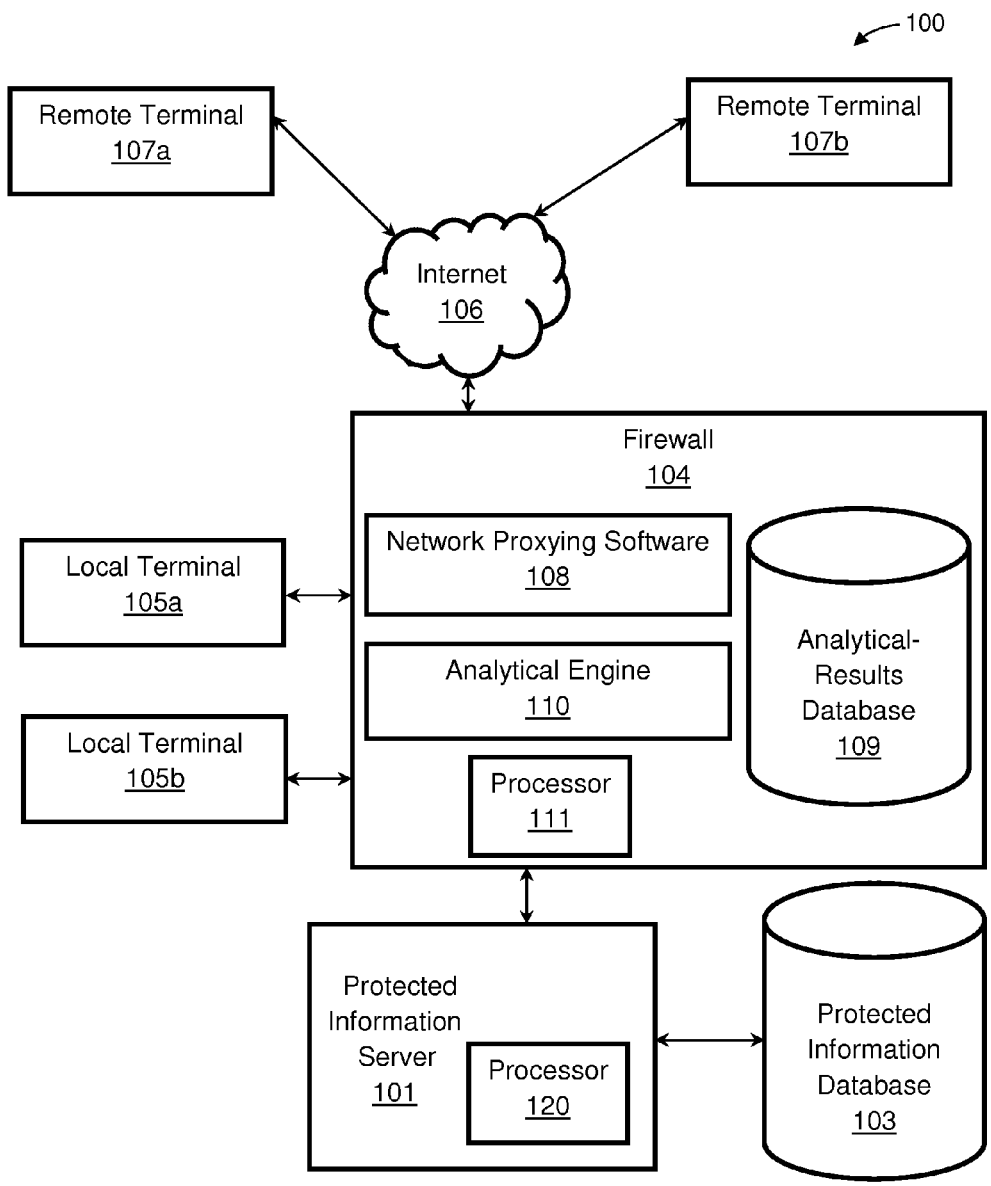
FIG. 1 illustrates a firewall system employing detection of application anomalies, consistent with one exemplary embodiment of the disclosure.

With reference now to FIG. 1, a firewall system 100 employing detection of application anomalies, consistent with one exemplary embodiment of the disclosure, is illustrated. As shown, system 100 includes a protected information server 101 (e.g., a financial transaction server) having a processor 120 and coupled to a protected information database 103. Server 101 resides behind a firewall 104 and is accessible via firewall 104 by means of local terminals 105*a* and 105*b*, as well as via the Internet 106 by means of remote terminals 107*a* and 107*b*.

In FIG. 1, protected information server 101 is accessed via local terminals 105*a*, 105*b* and remote terminals 107*a*, 107*b* using the HTTP (web) protocol. The network connecting the various components is a physical network (e.g., an Ethernet LAN) employing the IP protocol.

Firewall 104 includes network proxying software 108, analytical-results database 109, an analytical engine 110, and a processor 111 that executes appropriate software to coordinate the functionality of these components. Characteristics and functionality of these components will now be described, followed by an exemplary method of operation of firewall 104.

Network proxying software 108 is a component interposed in the switching fabric of firewall 104, i.e., in data-network links that carry the communications by which electronic information is accessed. Network proxying software 108 is adapted to block traffic passing through firewall 104 based on anomalies indicated by analytical engine 110. Notably, network proxying software 108 is different from conventional proxying software because, by employing information learned by analytical engine 110, network proxying software 108 is adapted to understand and monitor data within multiple data protocols, including ones that are proprietary and non-published, as will be explained in further detail below. Network proxying software 108 has the ability to decompose the contents of these protocols to a relatively fine level of granularity and can performs its functions without noticeable degradation of performance, e.g., by working inline with data communications within firewall 104.

Analytical-results database 109 is used to store the behavioral characteristics of the information systems for which network proxying software 108 decomposes protocols. Analytical-results database 109 is adapted to handle relatively-large datasets efficiently, since the value of the analysis to be performed increases with both the amount of data collected and its dimensionality.

Analytical engine 110 uses a combination of so-called machine-learning techniques to produce a multivariate description of the affected information systems that is rich enough to predict in detail the future behavior of the system. To accomplish this, in one embodiment, unsupervised-learning techniques and supervised machine-learning techniques are used simultaneously. The outputs from these completely different learning modes are used to reinforce each other, and to narrow the spectrum of information-system behaviors that are recognized as anomalous, thus producing a far more practical system than is available with conventional approaches.

In one embodiment, network proxying software 108, analytical-results database 109, and analytical engine 110 are deployed together within the same computer hardware, or in a small cluster of connected computers.

Analytical engine 110 observes anomalies detected in the actual communications, which are inspected by network proxying software 108 and stored in analytical-results database 109. Analytical engine 110 communicates such anomalies instantly to network proxying software 108. Network proxying software 108 is adapted to block traffic passing through firewall 104 based on anomalies indicated by analytical engine 110, thus preventing malicious traffic from arriving at protected information server 101.

The foregoing arrangement provides protection for protected information server 101, driven primarily by machine-learned behavior about the information system itself, and not merely by rules (as in conventional approaches), or by attributes of the entity that initiates the communications (as in authentication and authorization-based access controls). It should be recognized that, in alternative embodiments, one or more rule-based, authentication-based, and/or authorization-based schemes may be used in connection with one or more unsupervised-learning techniques and/or supervised machine-learning techniques.

In system 100, firewall 104 serves as an application-layer (or "Layer-7") firewall. Firewall 104 interprets protocols in the communications streams by which protected information server 101 is accessed and applies rules to those streams. The rules express behavioral constraints in terms of the structure and the data present in the application itself. Based on determinations made as a result of applying these rules, network proxying software 108 allows, blocks, or modifies accesses to protected information server 101.

It should be understood that firewall 104 is made aware of the structure and data of the applications executed by processor 102 on protected information server 101, thus permitting access control by detection of behavioral anomalies. In this sense, an anomaly means a pattern of access to an information system that violates the constraints of a behavioral model of the protected information system. The model can be constructed statically and/or may be determined via dynamic processes, such as "machine learning." Conventional firewalls are unable to apply such access control, because their rules are expressed in terms of communications, session, or user-identity parameters, rather than in terms of the protected system's structure itself and its application-level data.

Firewall 104 is adapted to automatically learn the structure and data of the information systems it protects. This removes the need for operators to manually construct rules for the firewall based on the data and behavioral attributes of the protected information systems, although such rules could be used in combination with automatic learning, in certain embodiments of the disclosure.

Figure 2:
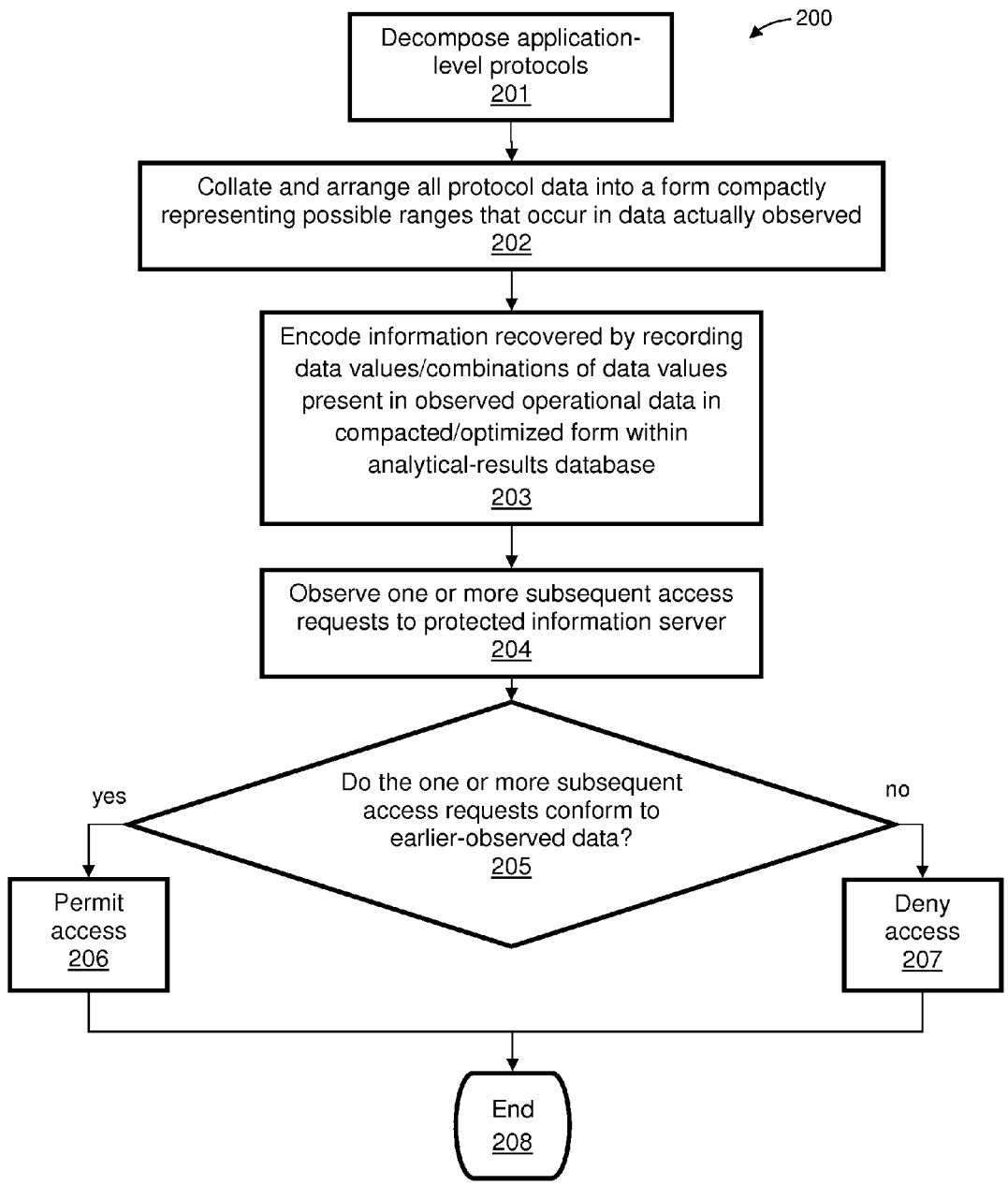
FIG. 2 shows a flowchart of an exemplary method by which the firewall automatically learns the structure and data of the protected information server and uses that learned information to control access to the protected information server, in one exemplary embodiment of the disclosure.

With reference now to FIG. 2, a flowchart illustrates an exemplary method 200 implemented in analytical engine 110 by which firewall 104 automatically learns the structure and data of protected information server 101 and uses that learned information to control access to protected information server 101, in one exemplary embodiment of the disclosure.

First, at step 201, the application-level protocols by which accessors communicate with the protected system are decomposed by analytical engine 110, e.g., on a packet-by-packet or frame-by-frame basis. These protocols include, e.g., one or more of the following: low-level protocols such as Ethernet frames or serial-bus (RS-232/485) frames; IP headers; TCP/UDP/ICMP/IGMP headers; higher-level protocols such as HTTP, SMTP, FIX, LDAP, SSL/TLS; protocols intended for carrying industrial data, such as DNP3, MODBUS/TCP, MODBUS/RTU, ANSI C12.22, IEC61850; and others. In general, a combination of one or more of these protocols will be in use with any particular application on protected information server 101. In one embodiment, analytical engine 110 is capable of decomposing and extracting all of the data values present in any of the protocols. Analytical engine 110 might, for example, decompose the HTTP protocol, extracting the data values that remote terminal 107a wishes to submit to protected information server 101.

Next, at step 202, analytical engine 110 collates and arranges the data from all the protocols, which data is extracted for some or all of the accesses to the protected application, into a form that compactly represents the possible ranges that occur in the data which was actually observed by analytical engine 110. In essence, analytical engine 110 records all of the possible data values that it observes throughout the communications stack that accesses the protected applications on protected information server 101. In addition to or instead of recording specific data values in particular fields or positions within the communication protocols, analytical engine 110 records which particular combinations of data values from different parts of the protocol stack occur together, and which occur together either rarely or not at all. This analysis may be coarse-grained (involving only a small number of fields from the protocol stack) and/or fine-grained (involving a very large number of fields).

At step 203, analytical engine 110 then encodes the information recovered by recording the data values and/or combinations of data values present in the observed operational data in a compacted and optimized form within analytical-results database 109.

Next, at step 204, analytical engine 110 observes one or more subsequent access requests to protected information server 101, in either real-time or out-of-band fashion.

Then, at step 205, analytical engine 110 examines the one or more subsequent access requests to determine whether these subsequent access requests conform to the data ranges and/or combinations of data ranges that were observed earlier. If so, then the method continues at step 206, at which access to protected information server 101 is granted. If not, then the method continues at step 207, at which access to protected information server 101 is denied. After either step 206 or step 207, the method terminates at step 208.

Accordingly, by observing the communications of protected information server 101, analytical engine 110 is said to "learn" the behavioral attributes, the data structures, and the operations supported by the applications running on protected information server 101, and is subsequently able to detect (in real time) accesses that are anomalous or at variance with the learned attributes. Various access-control operations can then be performed on such anomalous accesses, again in real time, including, e.g.: blocking such accesses altogether; modifying such accesses so as to remove their anomalous attributes; or reporting the presence of anomalous accesses to system operators.

Analytical engine 110 consults its configured ruleset to determine whether to grant a particular request for access, based on the specific data values contained in the request. In a relatively basic example, the firewall rule "allow form[data]='abc'" permits the access request, which contains a field named "data" and containing the value "abc". By contrast, an access request containing a form[data] value such as 'xyz' that does not match the required value 'abc' would cause the firewall to deny the request.

In certain embodiments, analytical engine 110 includes an "override" mechanism that allows a system operator to manually designate particular anomalous behaviors detected by the firewall as normal or non-anomalous. This permits manual "tuning" of the automatic-learning process.

The machine processes by which the firewall constructs a behavioral or "heuristic" baseline for the behavior of one or more protected systems may be relatively simple, or such processes may be quite elaborate. Such processes may also work on relatively few distinct variables or "features" in the behavioral data, or on relatively many. More elaborate processes and processes inspecting more features involve more processing time but produce more accurate results. Analytical engine 110 can readily be tuned to use more or fewer features and more or less elaborate analytical methods.

In a relatively simple embodiment, analytical engine 110 uses a "learning mode" to record ranges of data values already seen, and, in the future, to permit only values matching the ranges previously seen to pass through the system without triggering the determination of an access-control anomaly. In more elaborate embodiments, extensive machine-learning techniques may be applied to an entire corpus of data retrieved from observations of the communications to the protected systems. Such machine learning may involve any combination of Bayesian filtering, clustering analysis, so-called "supervised machine learning," so-called "unsupervised machine learning," and other techniques. The use of more elaborate means for analyzing the raw behavioral observations contributed by the system permits the detection of anomalies arising from particular combinations of data values that may previously have been seen and not considered anomalous in other combinations (detection of "false positives").

As discussed above, certain embodiments of the disclosure work by specifying valid ranges of data and commands that are permissible to submit to a protected information system. This is potentially a very large and complex set of rules and conditions. To address this problem, certain embodiments of the disclosure incorporate the ability to record the range of data and commands passing through a communications network to a protected information system. In this scenario, the application firewall constructs a set of rules based on its observations of the protected system's behavior during a "learning-mode" phase (e.g., steps 201-203 of FIG. 2), and subsequently applies the rules to the protected system during an "enforcement-mode" phase (e.g., steps 204-208 of FIG. 2).

In certain embodiments, automatically-constructed rules are employed. Such rules include, e.g.,: (i) a "verb" (e.g., allow, deny, rewrite, or log) indicating an action for network proxying software 108 to take, followed by (ii) a "control" subject that names an aspect of data or command-language from protected information server 101, followed by (iii) an "operator" or comparator (e.g., equals, is less than or equal to, is not equal to, is in the set of, is not in the set of, contains, does not contain, etc.), and (iv) a "value" predicate that specifies an allowable value or range of values for the "control" subject.

In one exemplary embodiment, an industrial robot (e.g., as employed in a manufacturing process) is controlled by way of a software controller that communicates with the robot using a serial communications network based on the RS-485 protocol. In this scenario, the controller and the robot exchange messages coded using the conventional MODBUS protocol and are not coupled or networked to any additional devices other than a firewall consistent with one embodiment of the disclosure (employing, e.g., analytical engine 110 or an analogous component), which is interposed in the communication stream between the controller and the robot. As described above with respect to FIG. 2, the firewall decomposes the MODBUS messages, extracting the data values that the controller wishes to submit to the robot. Typically, these messages contain requests for current status and/or commands to initiate physical operations. The firewall consults its configured ruleset to determine whether to allow the access, based on the specific application-level data values contained in the request. For example, a firewall rule "allow write-register[100]<=100" permits the access request if (an attempt is made to set the register numbered 100 contained within the robot to a valid value, i.e., a value of 100 or less). The request will be granted only if the data value is valid. For example, an access request containing a data value of 75 will be permitted because 75 does not exceed the threshold of 100, while an access request containing a value of 105 would be denied.

Below are some examples of application-level firewall rules that might be relevant to a web application using the HTTP protocol, in certain embodiments of the disclosure.

EXAMPLE 1

Allow uri=/testpages/*

The rule of Example 1 would allow any web request in which the URI was of the form /testpages/*, where the symbol * denotes a wildcard pattern. This rule would also implicitly reject any web access with a URI in any other form. If more than one rule is specified which begins with "Allow uri=", then any specified range of URIs can be allowed, effectively controlling access based on the specific aspect of the URI value.

EXAMPLE 2

Allow user-information-form [social-security-number]=~\d\d\d\-\d\d\-\d\d\d

The rule of Example 2 constrains the value of an application-level data value named "social-security-number", contained in an HTML form named "user-information-form", and a range that matches the proper syntax for a United States government-issued Social-Security Number. It is noted that the comparator (=~) specifies a regular-expression match rather than a wildcarded lexical match, as in the Example 1. The action of this rule is to verify that such a data field in such an HTML form is present, and that the data value has proper syntax. In any other case, the application firewall will block, reject, or rewrite the access.

An alternative example of data combinations that might be collected and analyzed by firewall 104 in one embodiment of the disclosure would be a web-based application running on protected information server 101 operated by a financial firm, which facilitates financial transactions initiated by individuals who are clients of the firm and who access protected information server 101 via remote terminals 107a and 107b. In this scenario, analytical engine 110 collects session and/or network attributes, including, e.g., information about IP addresses from which specific clients access the system, the times of day of access, and the specific encryption types used. In the manner described above with respect to FIG. 2, analytical engine 110 collects specific information about the operations invoked by specific individuals and the dollar amounts and other application-specific data pertaining to each access to protected information server 101. These application-specific data elements are combined with each other by analytical engine 110 and correlated with the session and network attributes, to form a precise and detailed picture of the typical behavior of users of the system in general, and also of the behavior of particular users. This overall picture is represented within analytical-result database 109, which continuously evolves as the system operates. Bayesian, clustering, and other kinds of machine-learning analysis is used by analytical engine 110 to determine the "distance" of any specific access from the norms represented in analytical-result database 109. In this way, fraudulent or malicious behaviors can be discovered easily.

In such embodiments, the amount of behavioral data constructed by analytical engine 110 and stored within analytical-result database 109 can easily and readily become much larger than can be contained within one physical computer. In particular, analytical engine 110 might gather data specific to the norms for a plurality of different software applications and store that data within analytical-result database 109. In this scenario, instead of using a single hardware device as firewall 104, firewall 104 might instead be more appropriately configured as a network of firewalls, all of which are adapted to contribute behavioral data to a database that can subsequently be shared by more than one firewall. This arrangement will now be described in further detail with respect to FIGS. 3-8.

Figure 3:
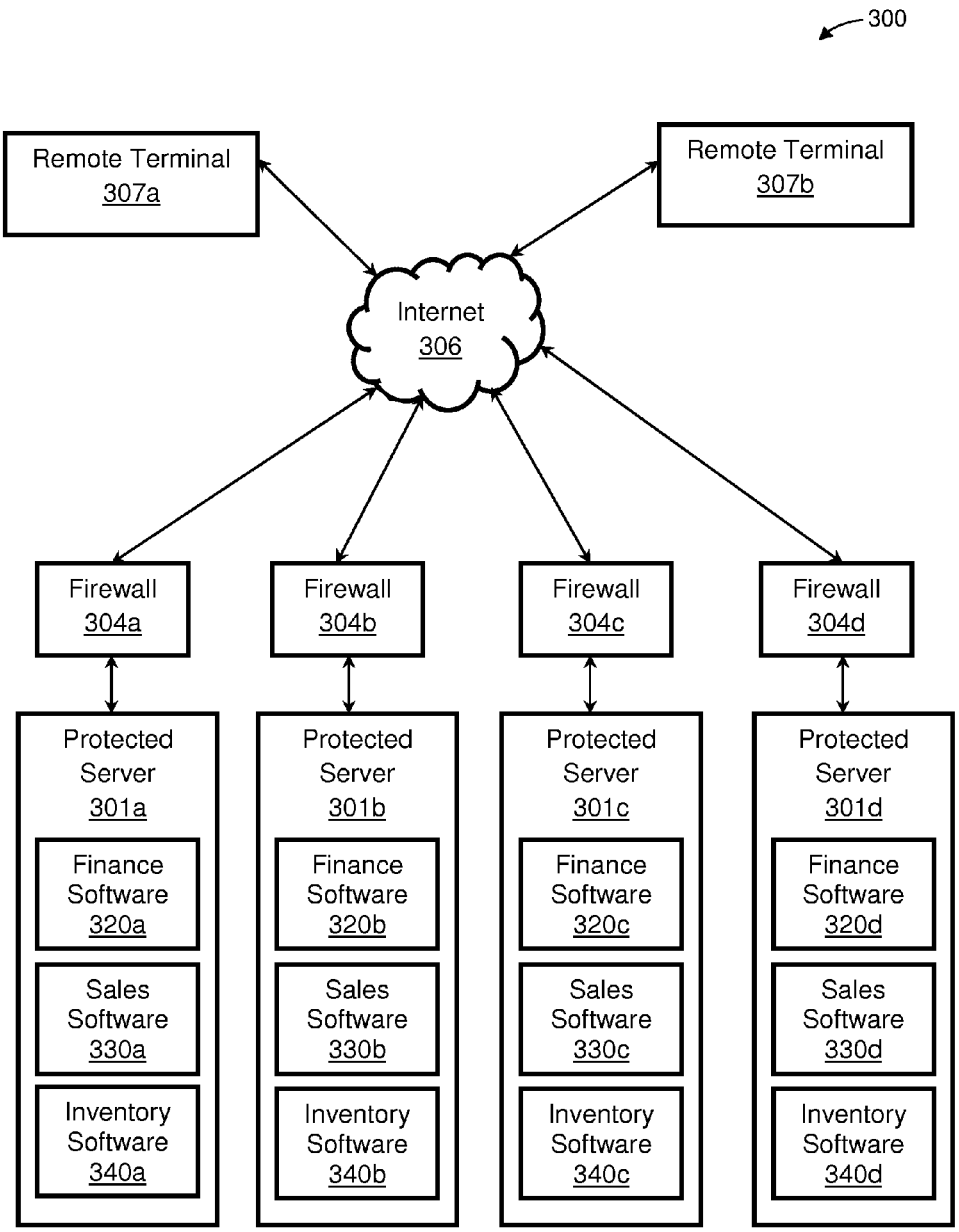
FIG. 3 shows a multiple-firewall system employing detection of application anomalies, consistent with another exemplary embodiment of the disclosure.

Turning now to FIG. 3, a multiple-firewall system 300 employing detection of application anomalies, consistent with another exemplary embodiment of the disclosure, is illustrated. As shown, system 300 includes a fleet of firewalls 304a-304d protecting a portfolio of three different applications scaled across multiple servers 301a-301d within a large corporate enterprise. Each firewall is similar to firewall 104 of FIG. 1, except as otherwise described below. There are four protected servers 301a-301d in this embodiment, each server respectively containing three different applications, namely, finance software 320a-320d, sales software 330a-330d, and inventory software 340a-340d. Each of protected servers 301a-301d resides behind a respective one of firewalls 304a-304d. User access to the three applications takes place via the Internet, by means of one of remote terminals 307a, 307b. Protected servers 301a through 301d are in communication with one another, e.g., via the Internet 306 or a local network (not shown), so that the software programs running on these multiple servers can share information and execute in a scaled fashion. Firewalls 304a through 304d are also in communication with one another, e.g., via the Internet 306 or a local network (not shown), so that information can be shared among these firewalls, as will be described in further detail below.

Figure 4:
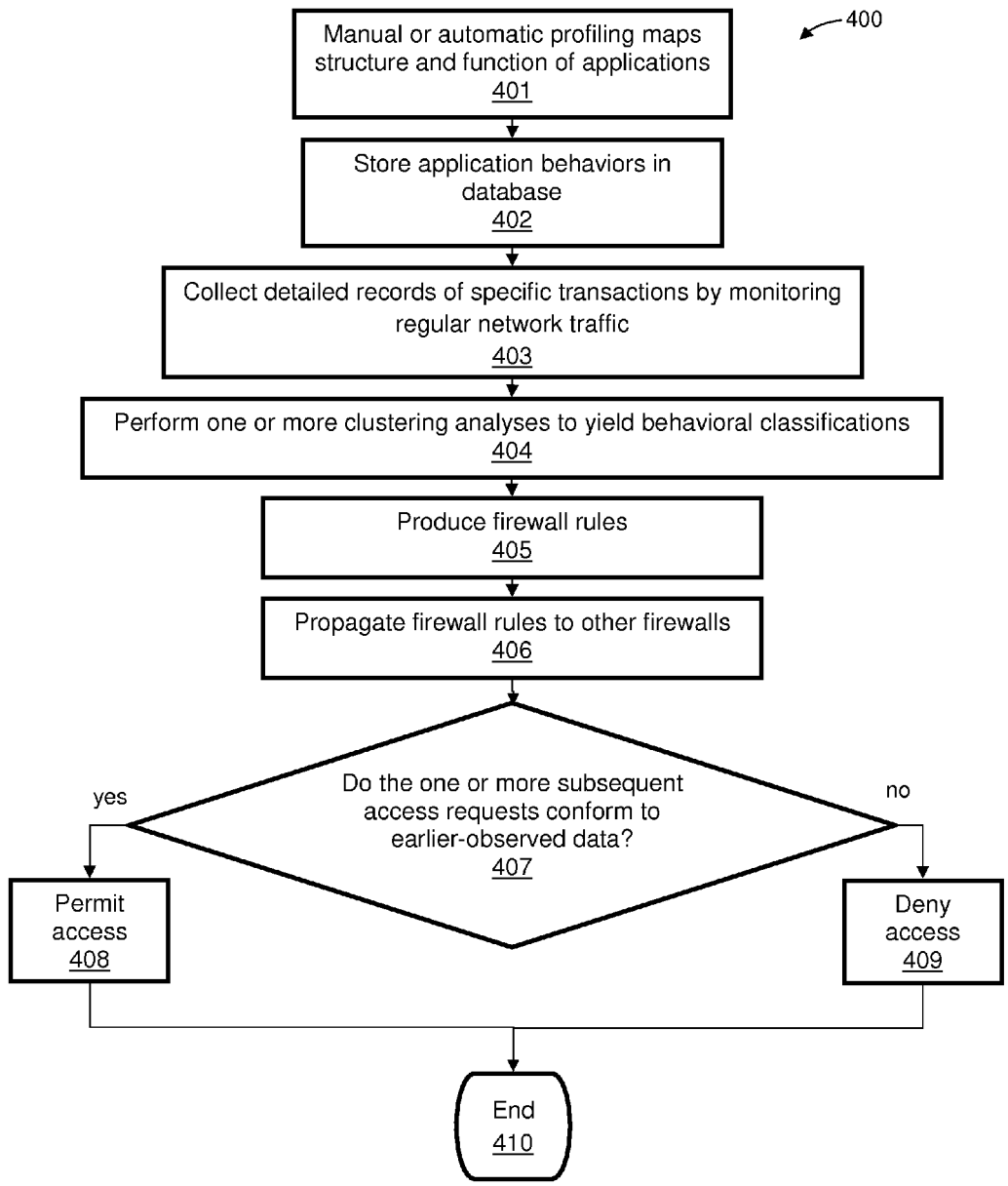
FIG. 4 shows a flowchart of an exemplary method for learning the structure and data of a plurality of applications running on the protected servers and using that learned information to control access to the protected servers, in one embodiment of the disclosure.

With reference now to FIG. 4, a flowchart illustrates an exemplary method 400 implemented in firewall 304a for learning the structure and data of all three of the applications running on protected servers 301a-301d and using that learned information to control access to protected servers 301a-301d, in one embodiment of the disclosure. It should be understood that a method similar or identical to method 400 is concurrently implemented in firewalls 304b, 304c, and 304d.

First, at step 401, a user employs firewall 304a to manually access finance software 320a, sales software 330a, and inventory software 340a for the purpose of initially mapping out the structure and functions of the applications, so that firewall 304a can learn "correct" behaviors for these software programs. Alternatively, during this step, an unattended profiling process can be used to automatically access these applications, just as might be done by a normal user, but for the specific purpose of mapping out the structure and functions of the applications. A combination of manual and automatic profiling can also be used.

Next, at step 402, based on either the manual or automatic profiling process, a database (not shown) of application behaviors is produced and stored, in like fashion to analytical-results database 109 of FIG. 1. This database resides within firewall 304a and is shared (e.g., by means of periodic updates) with respective databases for firewalls 304b, 304c, and 304d (it should be understood that, alternatively, all four firewalls could be configured to share a single database). The database contains transactional descriptions for all three of the applications that were profiled, as well as a resulting set of rules that define allowable transactions for each application. A combined set of rules for all three applications will be enforced by firewalls 304a-3304d concurrently. FIGS. 5a-5c collectively show an exemplary rule set created during step 402 and stored in an analytical-results database, in one embodiment of the disclosure. As discussed above, each rule in the rule set shown in FIGS. 5a-5c includes (i) a "verb" (e.g., allow, deny, rewrite, or log) indicating an action for network proxying software 108 to take, followed by (ii) a "control" subject that names an aspect of data or command-language from protected information server 101, followed by (iii) an "operator" or comparator (e.g., equals, is less than or equal to, is not equal to, is in the set of, is not in the set of, contains, does not contain, etc.), and (iv) a "value" predicate that specifies an allowable value or range of values for the "control" subject.

In addition to the initial profiling that takes place at step 402, further information for creating rules is gathered at step 403, wherein firewall 304a monitors network traffic sent to and received by protected server 301a and dissects that traffic to collect detailed records of application-specific transactions that are executed by each user. It is noted that, in a typical organizational network, different users in the community have different privilege levels, and the information collected about transactions executed by different users desirably includes data regarding which users normally perform certain functions within a given application, so that this information can be taken into account in detecting anomalous activity. It should be understood that, instead of being implemented by a firewall, step 403 could alternatively be implemented by a sensor that merely monitors traffic, without actually being inline with that traffic. FIGS. 6a-6p collectively show a set of exemplary collected application-specific transactions collected from multiple different applications during step 403 and stored in an analytical-results database, in one embodiment of the disclosure. The information for these application-specific transactions includes specific data values entered by users and outputted by applications, as well as other data corresponding to each transaction, e.g., source IP address, target IP address, protocol information, number of bytes written, number of bytes read, and the like.

Next, at step 404, firewall 304a employs analytical engine 110 to perform one or more clustering analyses. This process involves analyzing the data obtained in steps 402 and 403 (e.g., as shown in FIGS. 5a-5c and 6a-6p) and producing classifications of transactions in light of specific user behavior across the plurality of applications. Data points to describe user behavior are generated across a plurality of applications based on information on features such as network addresses, wire protocols, time of day, user name, and the like. This data is used to create a two-dimensional matrix of transactions versus features, such that the features are comparable to one another in a numerical way, which is done by means of one or more clustering algorithms.

Clustering algorithms used to analyze this data and discover classifications within the analyzed data include one or more of, e.g.: co-clustering, k-means clustering, graph-theoretic clustering, Bayesian classification, and neural-network analysis. In the embodiment of FIG. 4, a co-clustering algorithm (e.g., as described in J. A. Hartigan, "Direct Clustering of a Data Matrix," *Journal of the American Statistical Association*, Vol. 67, No. 337, March 1972, pp. 123-129, incorporated herein by reference) is used to correlate qualitative transactional data from the various diverse applications, since such transactional data is ordinarily semantic by nature and difficult to compare without an algorithm such as co-clustering.

The result of the clustering process is a list of classifications of user behavior, including qualifications such as business function, job role, access times of day and week, and the like. FIG. 7 shows an exemplary matrix containing such a list of classifications stored in an analytical-results database, in one embodiment of the disclosure. The example of FIG. 7 shows the following discovered behavioral classifications in the data obtained in steps 402 and 403 (e.g., as shown in FIGS. 5a-5c and 6a-6p):

(1) Users posting financial transactions, typically in the morning, from geographic areas A and B;

(2) Users accessing financial data while posting sales transactions, typically all day, from geographic areas B and D;

(3) Users accessing only email systems from low-bandwidth connections at any time of the day and on weekends from anywhere in the world; and (4) Users querying inventory and accessing manufacturing-support systems throughout business hours, from geographic area C.

Next, at step 405, an updated set of firewall rules is produced as a result of the cluster analysis of step 404. FIG. 8 shows an exemplary set of updated rules produced as a result of the cluster analysis and stored in an analytical-results database, in one embodiment of the disclosure. FIG. 8 is equivalent to FIG. 5a, with the addition of lines 3-10 appearing in bold. These added lines, which were automatically generated as a result of performing cluster analysis on application-level data, include: (i) a rule that denies access to a whole application based on identification of the source network, and (ii) a rule that denies access to certain transactions by certain users.

Next, at step 406, the updated set of firewall rules is propagated from the analytical-results database for firewall 304a and shared with firewalls 304b, 304c, and 304d, so that the updated set of firewall rules can be included in firewalls 304b, 304c, and 304d. A conflict-checking mechanism may be employed to resolve any conflicts between existing firewall rules in one of firewalls 304a-d and the updated set of rules. For example, if a previously-existing rule conflicts with a newly-generated rule, then the newly-generated rule replaces the previously-existing rule.

At step 407, one or more subsequent access requests are examined, to determine whether these subsequent access requests conform to the data ranges and/or combinations of data ranges that were observed earlier. If so, then the method continues at step 408, at which access through firewall 304a is granted. If not, then the method continues at step 409, at which access through firewall 304a is denied. After either step 408 or step 409, the method terminates at step 410.

In an alternative embodiment, firewalls 304a-304d are used in different networks and are under the control of different operators. In this scenario, operators of firewalls 304a-304d can choose whether to enforce specific rules in an advisory fashion (i.e., violations merely produce alerts), or in a blocking fashion (i.e., violations prevent transactions from completing), the latter of which is shown, e.g., in step 207 of FIG. 2 and step 409 of FIG. 4. In either case, a report may be generated to show violations of the classifications, i.e., user behaviors that do not match any of the classifications.

Different embodiments of the disclosure may be adaptable for different and specialized purposes. Embodiments of the disclosure may include implementation of a firewall in a hardened appliance and may be adapted, e.g., to protect a plurality of applications in a large heterogeneous environment, such as a private cloud.

It should also be understood that one or more firewalls consistent with embodiments of the disclosure can be employed, e.g., at endpoint nodes of a network, centrally within a network, as part of a network node, between a standalone pair of interconnected devices not networked to other devices (e.g., between an industrial robot and a controller), at a user's end, at the server end, or at any other location within a scheme of interconnected devices so as to prevent unauthorized access.

It should be understood that appropriate hardware, software, or a combination of both hardware and software is provided to effect the processing described above, in the various embodiments of the disclosure. It should further be recognized that a particular embodiment might support one or more of the modes of operation described herein, but not necessarily all of these modes of operation.

It should be understood that various changes in the details, materials, and arrangements of the parts which have been described and illustrated in order to explain the nature of embodiments of the disclosure may be made by those skilled in the art without departing from the scope of the disclosure. For example, it should be understood that the inventive concepts of embodiments of the disclosure may be applied not only in firewall systems and devices, but also in other communications applications for which embodiments of the disclosure may have utility, including the prevention of unauthorized access at or within a single device.

Embodiments of the present disclosure can take the form of methods and apparatuses for practicing those methods. Such embodiments can also take the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing embodiments of the disclosure. Embodiments of the disclosure can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing embodiments of the disclosure. When implemented on a general-purpose processor, the program code segments combine with the processor to provide a unique device that operates analogously to specific logic circuits.

It will be appreciated by those skilled in the art that although the functional components of the exemplary embodiments of the system described herein may be embodied as one or more distributed computer program processes, data structures, dictionaries and/or other stored data on one or more conventional general-purpose computers (e.g., IBM-compatible, Apple Macintosh, and/or RISC microprocessor-based computers), mainframes, minicomputers, conventional telecommunications (e.g., modem, T1, fiber-optic line, DSL, satellite and/or ISDN communications), memory storage means (e.g., RAM, ROM) and storage devices (e.g., computer-readable memory, disk array, direct access storage) networked together by conventional network hardware and software (e.g., LAN/WAN network backbone systems and/or Internet), other types of computers and network resources may be used without departing from the present disclosure. One or more networks discussed herein may be a local area network, wide area network, internet, intranet, extranet, proprietary network, virtual private network, a TCP/IP-based network, a wireless network (e.g., IEEE 802.11 or Bluetooth), an e-mail based network of e-mail transmitters and receivers, a modem-based, cellular, or mobile telephonic network, an interactive telephonic network accessible to users by telephone, or a combination of one or more of the foregoing.

Embodiments of the disclosure as described herein may be implemented in one or more computers residing on a network transaction server system, and input/output access to embodiments of the disclosure may include appropriate hardware and software (e.g., personal and/or mainframe computers provisioned with Internet wide area network communications hardware and software (e.g., CQI-based, FTP, Netscape Navigator™, Mozilla Firefox™, Microsoft Internet Explorer™, Google Chrome™, or Apple Safari™ HTML Internet-browser software, and/or direct real-time or near-real-time TCP/IP interfaces accessing real-time TCP/IP sockets) for permitting human users to send and receive data, or to allow unattended execution of various operations of embodiments of the disclosure, in real-time and/or batch-type transactions. Likewise, a system consistent with the present disclosure may include one or more remote Internet-based servers accessible through conventional communications channels (e.g., conventional telecommunications, broadband communications, wireless communications) using conventional browser software (e.g., Netscape Navigator™, Mozilla Firefox™, Microsoft Internet Explorer™, Google Chrome™, or Apple Safari™). Thus, embodiments of the present disclosure may be appropriately adapted to include such communication functionality and Internet browsing ability. Additionally, those skilled in the art will recognize that the various components of the server system of the present disclosure may be remote from one another, and may further include appropriate communications hardware/software and/or LAN/WAN hardware and/or software to accomplish the functionality herein described.

Each of the functional components of embodiments of the present disclosure may be embodied as one or more distributed computer-program processes running on one or more conventional general purpose computers networked together by conventional networking hardware and software. Each of these functional components may be embodied by running distributed computer-program processes (e.g., generated using "full-scale" relational database engines such as IBM DB2™, Microsoft SQL Server™, Sybase SQL Server™, or Oracle 10g™ database managers, and/or a JDBC interface to link to such databases) on networked computer systems (e.g., including mainframe and/or symmetrically or massively-parallel computing systems such as the IBM SB2™ or HP 9000™ computer systems) including appropriate mass storage, networking, and other hardware and software for permitting these functional components to achieve the stated function. These computer systems may be geographically distributed and connected together via appropriate wide- and local-area network hardware and software. In one embodiment, data stored in the database or other program data may be made accessible to the user via standard SQL queries for analysis and reporting purposes.

Primary elements of embodiments of the disclosure may be server-based and may reside on hardware supporting an operating system such as Microsoft Windows NT/2000™ or UNIX.

Components of a system consistent with embodiments of the disclosure may include mobile and non-mobile devices. Mobile devices that may be employed in embodiments of the present disclosure include personal digital assistant (PDA) style computers, e.g., as manufactured by Apple Computer, Inc. of Cupertino, Calif., or Palm, Inc., of Santa Clara, Calif., and other computers running the Android, Symbian, RIM Blackberry, Palm webOS, or iPhone operating systems, Windows CE™ handheld computers, or other handheld computers (possibly including a wireless modem), as well as wireless, cellular, or mobile telephones (including GSM phones, J2ME and WAP-enabled phones, Internet-enabled phones and data-capable smart phones), one- and two-way paging and messaging devices, laptop computers, etc. Other telephonic network technologies that may be used as potential service channels in a system consistent with embodiments of the disclosure include 2.5G cellular network technologies such as GPRS and EDGE, as well as 3G technologies such as CDMA1xRTT and WCDMA2000, and 4G technologies. Although mobile devices may be used in embodiments of the disclosure, non-mobile communications devices are also contemplated by embodiments of the disclosure, including personal computers, Internet appliances, set-top boxes, landline telephones, etc. Clients may also include a PC that supports Apple Macintosh™, Microsoft Windows 95/98/NT/ME/CE/2000/XP/Vista/7™, a UNIX Motif workstation platform, or other computer capable of TCP/IP or other network-based interaction. In one embodiment, no software other than a web browser may be required on the client platform.

Alternatively, the aforesaid functional components may be embodied by a plurality of separate computer processes (e.g., generated via dBase™, Xbase™, MS Access™ or other "flat file" type database management systems or products) running on IBM-type, Intel Pentium™ or RISC microprocessor-based personal computers networked together via conventional networking hardware and software and including such other additional conventional hardware and software as may be necessary to permit these functional components to achieve the stated functionalities. In this alternative configuration, since such personal computers typically may be unable to run full-scale relational database engines of the types presented above, a non-relational flat file "table" (not shown) may be included in at least one of the networked personal computers to represent at least portions of data stored by a system according to embodiments of the present disclosure. These personal computers may run the Unix, Microsoft Windows NT/2000™ or Windows 95/98/NT/ME/CE/2000/XP/Vista/7™ operating systems. The aforesaid functional components of a system according to the disclosure may also include a combination of the above two configurations (e.g., by computer program processes running on a combination of personal computers, RISC systems, mainframes, symmetric or parallel computer systems, and/or other appropriate hardware and software, networked together via appropriate wide- and local-area network hardware and software).

A system according to embodiments of the present disclosure may also be part of a larger system including multi-database or multi-computer systems or "warehouses" wherein other data types, processing systems (e.g., transaction, financial, administrative, statistical, data extracting and auditing, data transmission/reception, and/or accounting support and service systems), and/or storage methodologies may be used in conjunction with those of the present disclosure to achieve additional functionality.

In one embodiment, source code may be written in an object-oriented programming language using relational databases. Such an embodiment may include the use of programming languages such as C++ and toolsets such as Microsoft's .Net™ framework. Other programming languages that may be used in constructing a system according to embodiments of the present disclosure include Java, HTML, Perl, UNIX shell scripting, assembly language, Fortran, Pascal, Visual Basic, and QuickBasic. Those skilled in the art will recognize that embodiments of the present disclosure may be implemented in hardware, software, or a combination of hardware and software.

Accordingly, the terms "computer" or "system," as used herein, should be understood to mean a combination of hardware and software components including at least one machine having a processor with appropriate instructions for controlling the processor. The singular terms "computer" or "system" should also be understood to refer to multiple hardware devices acting in concert with one another, e.g., multiple personal computers in a network; one or more personal computers in conjunction with one or more other devices, such as a router, hub, packet-inspection appliance, or firewall; a residential gateway coupled with a set-top box and a television; a network server coupled to a PC; a mobile phone coupled to a wireless hub; and the like. The term "processor" should be construed to include multiple processors operating in concert with one another.

It should also be appreciated from the outset that one or more of the functional components may alternatively be constructed out of custom, dedicated electronic hardware and/or software, without departing from the present disclosure. Thus, embodiments of the disclosure are intended to cover all such alternatives, modifications, and equivalents as may be included within the spirit and broad scope of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

It will be further understood that various changes in the details, materials, and arrangements of the parts which have been described and illustrated in order to explain the nature of this disclosure may be made by those skilled in the art without departing from the scope of the disclosure as expressed in the following claims.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

I claim:

1. A processor-implemented method for monitoring packets or frames of network traffic between a first device executing a software application and a second device coupled to the first device, the method comprising:
   (a) the processor analyzing, on a packet-by-packet or frame-by-frame basis, application-level data contained within traffic originating from and/or received by the first device, the application-level data including data provided to and/or provided by the software application;
   (b) based on the results of the analysis in step (a), and without obtaining any feedback or approval from a user, the processor creating and storing in a database one or more access rules, each access rule specifying at least (i) an aspect of application-level data, (ii) an operator or comparator, (iii) an allowable value or range of values for the aspect of application-level data, and (iv) an action to be taken if the aspect of application-level data in an access request contained in a received packet or frame satisfies the allowable value or range of values when the operator or comparator is applied;
   (c) the processor receiving a packet or frame containing a request from the second device to access the first device, the request including application-level data;
   (d) for one or more of the access rules, the processor determining whether the packet or frame containing the request received in step (c) complies with the access rule by determining whether the aspect of application-level data in the request satisfies the allowable value or range of values of the access rule when the operator or comparator of the access rule is applied; and
   (e) the processor initiating an instruction to perform the action in the access rule if the packet or frame containing the request received in step (c) complies with the access rule.

2. The method of claim 1, further comprising:
   (e) the processor denying the request contained in the packet or frame received in step (c), if the request is determined in step (d) not to comply with one or more of the access rules.

3. The method of claim 1, wherein step (a) comprises decomposing one or more application-level protocols.

4. The method of claim 1, wherein at least one access rule is created in step (b) based on application-level data corresponding to a plurality of different software applications.

5. The method of claim 1, wherein:
   the processor is in communication with another processor configured to perform steps (a) through (d); and further comprising:
   the processor providing one or more of the access rules to the other processor for the other processor to use for performing step (d).

6. The method of claim 1, wherein:
   the processor is in communication with another processor configured to perform steps (a) through (d); and further comprising:
   the processor receiving one or more of the access rules from the other processor to use for performing step (d).

7. The method of claim 1, wherein step (a) comprises:
   the processor performing automatic profiling to map at least one structural and/or functional characteristic of the software application based on the data of the software application.

8. The method of claim 1, wherein step (a) or step (b) comprises:
   using the application-level data to determine a normal or expected behavior of a user of the software application.

9. The method of claim 8, wherein the normal or expected behavior of the user is determined using one or more clustering algorithms.

10. Apparatus for monitoring packets or frames of network traffic, the apparatus comprising:
    a first firewall having a processor, the first firewall comprising:
    an analytical engine configured to analyze, on a packet-by-packet or frame-by-frame basis, application-level data contained within traffic originating from and/or received by a first device executing a software application, the application-level data including data provided to and/or provided by the software application;
    an analytical-results database comprising one or more access rules created without obtaining any feedback or approval from a user, the one or more access rules based on the analysis of the application-level data by the analytical engine, each access rule specifying at least (i) an aspect of application-level data, (ii) an operator or comparator, (iii) an allowable value or range of values for the aspect of application-level data, and (iv) an action to be taken if the aspect of application-level data in an access request contained in a received packet or frame satisfies the allowable value or range of values when the operator or comparator is applied; and network-proxying software configured to determine whether a request, contained in a packet or frame received from a second device coupled to the first device, to access the first device complies with one or more of the access rules stored in the analytical-results database, wherein:

the packet or frame containing the request from the second device includes application-level data;

the network-proxying software is configured to determine whether the packet or frame containing the request complies with an access rule by determining whether the aspect of application-level data in the request satisfies the allowable value or range of values of the access rule when the operator or comparator of the access rule is applied; and the network-proxying software is further configured to initiate an instruction to perform the action in the access rule if the packet or frame containing the request complies with the access rule.

11. The apparatus of claim 10, wherein the network-proxying software is configured to deny the request contained in the packet or frame received from the second device, if the request is determined not to comply with one or more of the access rules.

12. The apparatus of claim 10, wherein the analytical engine is configured to decompose one or more application-level protocols.

13. The apparatus of claim 10, wherein at least one access rule is created based on application-level data corresponding to a plurality of different software applications.

14. The apparatus of claim 10, wherein:

the first firewall is in communication with a second firewall comprising:

a processor;

an analytical engine configured to analyze, on a packet-by-packet or frame-by-frame basis, application-level data contained within traffic originating from and/or received by a first device executing a software application, the application-level data including data provided to and/or provided by the software application;

an analytical-results database comprising one or more access rules created without obtaining any feedback or approval from a user, the one or more access rules based on the analysis of the application-level data by the analytical engine; and network-proxying software configured to determine whether a request, contained in a packet or frame received from a second device coupled to the first device, to access the first device complies with one or more of the access rules stored in the analytical-results database, wherein the packet or frame containing the request from the second device includes application-level data; and the first firewall is configured to provide one or more of the access rules to the second firewall, for storage in the analytical-results database of the second firewall and use by the network-proxying software of the second firewall in determining whether a packet or frame received by the second firewall, containing an access request, complies with the one or more access rules provided to the second firewall by the first firewall.

15. The apparatus of claim 10, wherein: the first firewall is in communication with a second firewall comprising:

a processor;

an analytical engine configured to analyze, on a packet-by-packet or frame-by-frame basis, application-level data contained within traffic originating from and/or received by a first device executing a software application, the application-level data including data provided to and/or provided by the software application;

an analytical-results database comprising one or more access rules created without obtaining any feedback or approval from a user, the one or more access rules based on the analysis of the application-level data by the analytical engine; and network-proxying software configured to determine whether a request, contained in a packet or frame received from a second device coupled to the first device, to access the first device complies with one or more of the access rules stored in the analytical-results database, wherein the packet or frame containing the request from the second device includes application-level data; and the first firewall is configured to receive one or more of the access rules from the second firewall, for storage in the analytical-results database of the first firewall and use by the network-proxying software of the first firewall in determining whether a packet or frame received by the first firewall, containing an access request, complies with the one or more access rules provided to the first firewall by the second firewall.

16. The apparatus of claim 10, wherein the analytical engine is configured to perform automatic profiling to map at least one structural and/or functional characteristic of the software application based on the data of the software application.

17. The apparatus of claim 10, wherein the analytical engine is configured to use the application-level data to determine a normal or expected behavior of a user of the software application.

18. The apparatus of claim 17, wherein the normal or expected behavior of the user is determined using one or more clustering algorithms.

* * * * *